(12) United States Patent
Nakahara et al.

(10) Patent No.: US 7,940,935 B2
(45) Date of Patent: May 10, 2011

(54) CONTENT PLAYBACK APPARATUS, CONTENT PLAYBACK METHOD, COMPUTER PROGRAM, KEY RELAY APPARATUS, AND RECORDING MEDIUM

(75) Inventors: Tohru Nakahara, Osaka (JP); Ryuichi Okamoto, Osaka (JP); Masaya Yamamoto, Osaka (JP); Katsumi Tokuda, Osaka (JP); Masaya Miyazaki, Osaka (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 520 days.

(21) Appl. No.: 11/629,352

(22) PCT Filed: Jun. 30, 2005

(86) PCT No.: PCT/IB2005/003092
§ 371 (c)(1),
(2), (4) Date: Aug. 25, 2008

(87) PCT Pub. No.: WO2006/046099
PCT Pub. Date: May 4, 2006

(65) Prior Publication Data
US 2009/0214042 A1 Aug. 27, 2009

Related U.S. Application Data

(63) Continuation-in-part of application No. 10/880,504, filed on Jul. 1, 2004, now abandoned.

(51) Int. Cl.
*H04L 9/08* (2006.01)
(52) U.S. Cl. ........ 380/278; 380/277; 380/279; 380/280; 380/281; 380/282; 380/283; 380/284; 380/285; 380/286; 380/44; 380/45; 380/46; 380/47; 380/200; 380/201; 380/202; 380/203; 713/170; 713/171; 713/172; 705/50; 705/57; 705/71
(58) Field of Classification Search .............. 726/26–33; 380/201–204, 277–286; 705/50, 57, 71
See application file for complete search history.

(56) References Cited

U.S. PATENT DOCUMENTS

| 6,516,064 | B1 | 2/2003 | Osawa et al. |
| 6,665,303 | B1 | 12/2003 | Saito et al. |
| 2002/0154779 | A1 * | 10/2002 | Asano et al. .................. 380/277 |

(Continued)

FOREIGN PATENT DOCUMENTS

EP 0 756 279 1/1997

(Continued)

*Primary Examiner* — Thanhnga B Truong
*Assistant Examiner* — Josnel Jeudy
(74) *Attorney, Agent, or Firm* — Wenderoth, Lind & Ponack, L.L.P.

(57) ABSTRACT

A content playback apparatus reduces load concentration on a specific server apparatus that manages content keys of encrypted content, while protecting copyrights of the content. The content apparatus makes playback of content recorded in a recording medium sold possible after the specific server breaks down. A key acquisition control unit (204) reads a playback control information table (211) from a recording medium (102) via a reading unit (201). The key acquisition unit (204) acquires a rights key via a key acquisition intermediation unit (223) from an apparatus specified by an acquisition-destination type and a request-destination type that are stored in the playback control information table (211) and that corresponding to the content to be played. The key acquisition unit (204) generates a content key using the acquired rights key and, when required, a medium key recorded in a medium. A decryption unit (203) decrypts encrypted content using the content key.

12 Claims, 27 Drawing Sheets

U.S. PATENT DOCUMENTS

| | | | |
|---|---|---|---|
| 2003/0152222 A1* | 8/2003 | Nakano et al. | 380/201 |
| 2004/0039907 A1 | 2/2004 | Sako et al. | |
| 2004/0073516 A1* | 4/2004 | Yamamichi et al. | 705/57 |
| 2004/0078584 A1 | 4/2004 | Moroney et al. | |
| 2004/0093523 A1* | 5/2004 | Matsuzaki et al. | 713/201 |

FOREIGN PATENT DOCUMENTS

| | | |
|---|---|---|
| JP | 11-194987 | 7/1999 |
| JP | 2000-113050 | 4/2000 |
| JP | 2003-037589 | 2/2003 |

* cited by examiner

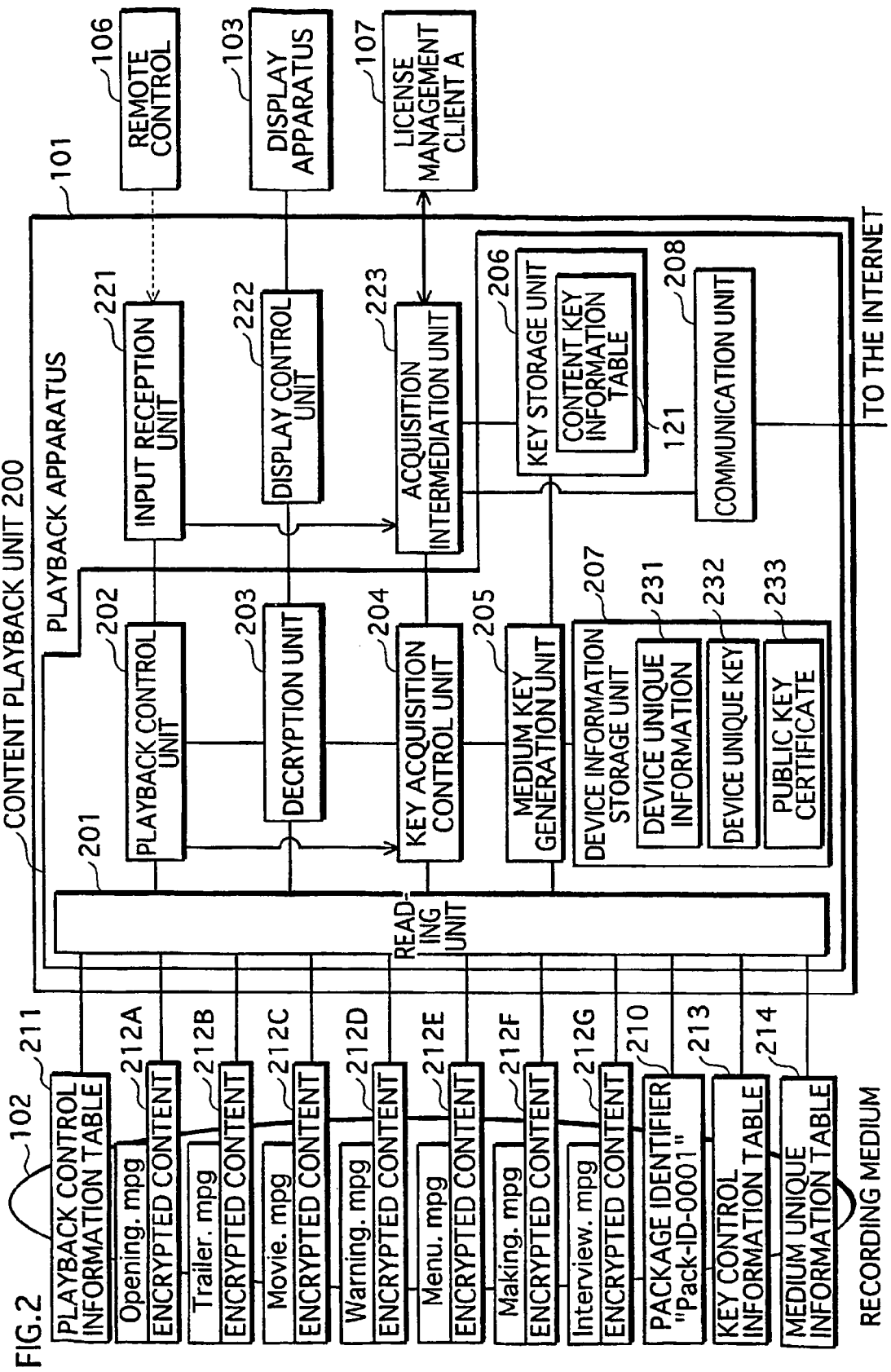

FIG.3

PLAYBACK CONTROL INFORMATION TABLE 211

| PLAYBACK NUMBER | CONTENT NAME | NEXT PLAYBACK NUMBER | ALTERNATIVE PLAYBACK NUMBER | CORRESPONDING RIGHTS METHOD INFORMATION | CONNECTION-DESTINATION TYPE | ACQUISITION-DESTINATION TYPE | PRIORITY LEVEL |
|---|---|---|---|---|---|---|---|
| 1 | Opening.mpg | 2 | — | 00(—) | — | — | — |
| 2 | Trailer.mpg | 3 | 4 | 00(—) | — | — | — |
| 3 | Movie.mpg | 5 | — | 01(METHOD A) | CLIENT A | SERVER | — |
| 4 | Warning.mpg | 5 | — | 00(—) | — | — | — |
| 5 | Menu.mpg | — | — | | | | |
| 6 | Making.mpg | 5 | — | 01(METHOD A) | CLIENT A | SERVER | 1 |
| | | | | 01(METHOD A) | CLIENT B | CLIENT B | 2 |
| 7 | Interview.mpg | 5 | — | 01(METHOD A) | SERVER | SERVER | 2 |
| | | | | 10(METHOD B) | SERVER | SERVER | 1 |

FIG.5

KEY CONTROL INFORMATION TABLE ~213

| CONTENT NAME | KEY CONTROL INFORMATION ||||| |
|---|---|---|---|---|---|
| | CONTENT UNIQUE INFORMATION | KEY GENERATION INFORMATION | PLAYABILITY INFORMATION | COPYABILITY INFORMATION | PUBLIC KEY CERTIFICATE |
| Opening.mpg | 1111 | 00 (MEDIUM KEY) | 1 (PLAYABLE) | 01 (Once) | 00 (—) |
| Trailer.mpg | 2222 | 00 (MEDIUM KEY) | 1 (PLAYABLE) | 10 (Free) | 00 (—) |
| Movie.mpg | 3333 | 01 (COMPOSITE KEY) | 0 (UNPLAYABLE) | 00 (Never) | Pub-key-a001 |
| Warning.mpg | 4444 | 00 (MEDIUM KEY) | 1 (PLAYABLE) | 00 (Never) | 00 (—) |
| Menu.mpg | 5555 | 00 (MEDIUM KEY) | 1 (PLAYABLE) | 00 (Never) | 00 (—) |
| Making.mpg | 6666 | 10 (RIGHTS KEY) | 0 (UNPLAYABLE) | 00 (Never) | Pub-key-a001 / Pub-key-a002 |
| Interview.mpg | 7777 | 10 (RIGHTS KEY) | 0 (UNPLAYABLE) | 00 (Never) | Pub-key-a003 / Pub-key-b003 |

511, 515 — Movie.mpg Pub-key-a001
512, 516, 517 — Making.mpg Pub-key-a001, Pub-key-a002

FIG.6

MEDIUM UNIQUE INFORMATION TABLE

214

| MEDIUM UNIQUE INFORMATION ||
|---|---|
| DEVICE UNIQUE INFORMATION | ENCRYPTED MEDIUM KEY |
| 0001 | qwerty |
| 0002 | asdfgh |
| 0004 | zxcvbn |
| 0005 | uiop@[ |
| 0006 | jkl;:] |
| 0007 | m,./¥¥ |
| ⋮ | ⋮ |

FIG.7

CONTENT KEY INFORMATION TABLE ~121

CONTENT KEY INFORMATION

| PACKAGE IDENTIFIER | CONTENT NAME | CONTENT KEY | PLAYBACK COUNT | PLAYBACK TIME LIMIT | PLAYBACK CONTROL CONDITION |
|---|---|---|---|---|---|
| Pack-ID-0001 | Movie.mpg | rvfsuw | 2 | – | 11(HIGH PICTURE AND SOUND QUALITY) |
| Pack-ID-0001 | Making.mpg | bteghi | 3 | ~2004/3/31 | 01(LOW PICTURE QUALITY) |
| Pack-ID-0002 | Making.mpg | bteghi | – | ~2005/1/1 | 00(LOW PICTURE AND SOUND QUALITY) |
| ... | ... | ... | ... | ... | ... |

KEY INFORMATION TABLE

| PACKAGE IDENTIFIER | CONTENT NAME | RIGHTS KEY |
|---|---|---|
| Pack-ID-0001 | Movie.mpg | qwerty |
| Pack-ID-0001 | Making.mpg | asdfgh |
| Pack-ID-0002 | Making.mpg | dbbwww |
| ⋮ | ⋮ | ⋮ |

FIG.10

USAGE CONDITION INFORMATION TABLE ~121

| PACKAGE IDENTIFIER | CONTENT NAME | PLAYBACK COUNT | PLAYBACK TIME LIMIT | PLAYBACK CONTROL CONDITION |
|---|---|---|---|---|
| Pack-ID-0001 | Movie.mpg | 2 | — | 11 (HIGH PICTURE AND SOUND QUALITY) |
| Pack-ID-0001 | Making.mpg | 3 | ~2004/3/31 | 01 (LOW PICTURE QUALITY) |
| Pack-ID-0002 | Making.mpg | — | ~2005/1/1 | 00 (LOW PICTURE AND SOUND QUALITY) |
| ... | ... | ... | ... | ... |

FIG.12

RIGHTS INFORMATION TABLE ~121

| PACKAGE IDENTIFIER | CONTENT NAME | RIGHTS KEY | PLAYBACK COUNT | PLAYBACK TIME LIMIT | PLAYBACK CONTROL CONDITION |
|---|---|---|---|---|---|
| Pack-ID-0001 | Movie.mpg | qwerty | 2 | — | 11(HIGH PICTURE AND SOUND QUALITY) |
| Pack-ID-0001 | Making.mpg | asdfgh | 3 | ~2004/3/31 | 01(LOW PICTURE QUALITY) |
| Pack-ID-0002 | Making.mpg | asdfgh | — | ~2005/1/1 | 00(LOW PICTURE AND SOUND QUALITY) |
| ... | ... | ... | ... | ... | ... |

FIG.13

| MESSAGE HEADER |
|---|
| MESSAGE BODY |

CONTENT PLAYBACK APPARATUS, CONTENT PLAYBACK METHOD, COMPUTER PROGRAM, KEY RELAY APPARATUS, AND RECORDING MEDIUM

This application is a Continuation-In-Part of application Ser. No. 10/880,504, filed on Jul. 1, 2004, now abandoned.

TECHNICAL FIELD

The present invention relates to a playback apparatus and a playback method for copyright-protected content, and to a recording medium that stores data used in the playback apparatus and the playback method.

BACKGROUND ART

Recording media such as DVDs (Digital Versatile Discs) on which works such as movies and music are digitally recorded have become prevalent in recent years. In order to prevent illegal copying of content a CSS (Content Scrambling System) has been introduced into the DVD standard. In the CSS, information unique to a DVD medium is recorded thereon, and a title key is generated from this information and information held by a playback device. The generated title key is used to decrypt encrypted content recorded on the DVD medium, and the resultant content is played (see Japanese Patent Application Publication No. 2003-37589).

On the other hand, content distribution systems that use a Digital Rights Management (DRM) system are also becoming common. In DRM, a license is distributed separately to encrypted content. The playback apparatus acquires the license from a specific acquisition destination (such as a specific server apparatus) that is stored in advance. The license includes a license key and a usage condition, and the encrypted content is decrypted using the license key and the resultant content is played in accordance with the usage condition.

As capacity of recording media for recording content continues to grow, it is envisioned that such large-capacity recording media will be distributed in the market place by means of retail sale or the like, with a plurality of contents recorded on any one such recording medium.

However, there are cases in which different contents recorded on any one such recording medium are subject to respectively different playback control management. Such cases include, for example, when a plurality of contents whose copyright holders bear no association with each other exist together on the recording medium, and when content whose usage is restricted according to a playback restriction and content whose usage is restricted according to a playback count exist together on the recording medium. Consequently, there is a necessity in such cases for the content recorded on the recording medium to be able to be played and also be appropriately protected from illegal usage.

In view of the stated problem, an object of the present invention is to provide a content playback apparatus, a content playback method, a computer program, a key relay apparatus, and a recording medium that are effective in enabling a plurality of contents that are subject to respectively different playback control management to be played and also be protected from illegal usage.

DISCLOSURE OF THE INVENTION

In order to solve the stated problem, the present invention is a content playback apparatus that decrypts encrypted content recorded on a recording medium, thereby obtaining content, and plays the content, the recording medium having recorded thereon a plurality of pieces of encrypted content respectively in correspondence with a plurality of pieces of management source information, each piece of management source information showing, from among a plurality of management source apparatuses, a management source apparatus that manages usage of the corresponding piece of encrypted content, the content playback apparatus including: a designation acquisition unit operable to acquire a designation of one of the pieces of encrypted content; a management source acquisition unit operable to acquire, from among the pieces of management source information recorded on the recording medium, a piece of management source information that corresponds to the designated piece of encrypted content; a key information acquisition unit operable to acquire, from the management source apparatus shown by the acquired piece of management source information, a piece of key information that shows usage permission for the designated piece of encrypted content; a decryption unit operable to generate a content key based on the acquired piece of key information, and generate a piece of content by decrypting the designated piece of encrypted content with use of the generated content key; and a playback unit operable to play the generated piece of content.

According to the stated structure, the piece of key information for the piece of encrypted content is acquired not from a fixed management source apparatus, but from a management source apparatus shown by the piece of management source information corresponding to the piece of encrypted content written on the recording medium. Therefore, in a case of a plurality of pieces of content that are subject to different playback control management differently being recording on one recording medium, the pieces of encrypted content can be played and also be protected from illegal usage, based on the respective playback control management performed by the respective management source apparatuses.

Here, at least one of the management source apparatuses may include a key relay apparatus that relays key information and a key management apparatus that manages key information, among the pieces of management source information, at least one of the pieces of management source information that shows the at least one management source apparatus that includes the key relay apparatus and the key management apparatus, may include a piece of key relay apparatus information that shows the key relay apparatus and a piece of key management apparatus information that shows the key management apparatus, the key information acquisition unit may include: a request transmission sub-unit operable to judge whether the acquired piece of management source information includes a piece of key relay information and a piece of key management apparatus information, and when the judgment is affirmative, transmit, to the key relay apparatus shown by the piece of key relay apparatus information included in the piece of management source information, (i) a piece of content designation information that shows the designated piece of encrypted content and (ii) the piece of key management apparatus information included in the piece of management source information; and a response acquisition sub-unit operable to acquire the piece of key information, which corresponds to the designated piece of encrypted content, from the key relay apparatus, the key relay apparatus may receive the piece of content designation information and the piece of key management apparatus information, transmit the piece of content designation information to the key management apparatus shown by the piece of key management apparatus information, receive from the key management apparatus the piece of key information corresponding to the piece of content designation information, and transmit the received piece of key information to the content playback apparatus, and the key management apparatus may receive the piece of content designation information, and transmit the piece of key information corresponding to the piece of content specification information to the key relay apparatus.

According to the stated structure, the piece of key information is acquired from a key management apparatus that is a different apparatus to the key relay apparatus. Therefore, even if the content playback apparatus cannot directly communicate with the key management apparatus, the piece of key information can be acquired from the key management apparatus via the key relay apparatus. Furthermore, if access to the key management apparatus is restricted to the key relay apparatus only, the key management apparatus is more secure than if it were able to be accessed by both the key relay apparatus and the content playback apparatus.

Here, at least one of the pieces of management source information may include a plurality of pieces of candidate information, each piece of candidate information showing a different one of a plurality of candidate apparatuses that are candidates for the management source apparatus pertaining to the piece of encrypted content corresponding to the piece of management source information, the key information acquisition unit may include: a candidate information judgment sub-unit operable to judge whether the acquired piece of management source information includes pieces of candidate information; an acquisition-destination determination sub-unit operable to, when the judgment is affirmative, select one of the pieces of candidate information included in the acquired piece of management source information; and a key information acquisition sub-unit operable to, when the judgment is affirmative, acquire, from the management source apparatus, which is the candidate apparatus shown in the selected piece of candidate information, the piece of key information showing usage permission for the designated piece of encrypted content, and when the judgment is negative, acquire the piece of key information from the management source apparatus shown by the piece of management source information.

According to the stated structure, the content playback apparatus is able to select one candidate apparatus as the management source apparatus from among a plurality of candidate apparatuses. Furthermore, if, for example, a malfunction should occur in a management source apparatus that is usually used, the playback apparatus is able to select another management source apparatus from which to acquire the piece of key information. This provides a system that enables reliable acquisition of key information.

Here, each piece of candidate information may include a priority level showing with how much priority the piece of candidate information is to be given with respect to other pieces of candidate information in selection, and the acquisition-destination determination sub-unit, when the judgment is affirmative, may select a piece of candidate information having a highest priority level among the pieces of candidate information, and select the piece of candidate information having the highest priority level as the one piece of candidate information.

According to the stated structure, the content playback apparatus is able to acquire the piece of key information from the management source apparatus that is the candidate apparatus having the highest priority level. Furthermore, if, for example, a malfunction should occur in a management source apparatus having the highest priority level, which is the candidate apparatus that is usually used, the playback apparatus is able to select another management source apparatus from which to acquire the piece of key information. This provides a system that enables reliable acquisition of key information.

Here, the acquisition-destination sub-unit may (a) store (i) a plurality of pieces of selection information, each of which shows a different one of a plurality of candidate apparatuses, in correspondence with (ii) a plurality of priority levels, each priority level showing with how much priority the corresponding piece of selection information is to be given with respect to other pieces of selection information in selection, (b) when the judgment is affirmative, read, with respect to each of the pieces of candidate information in the acquired piece of management source information, the priority level corresponding to the piece of selection information showing a same candidate apparatus as the piece of candidate information, (c) select a highest priority level from among the read priority levels, and (d) select the piece of candidate information that shows a same candidate apparatus as the piece of selection information corresponding to the selected priority level.

According to the stated structure, the content playback apparatus is able to acquire the piece of key information from the management source apparatus that is the candidate apparatus having the highest priority level. Furthermore, if, for example, a malfunction should occur in a management source apparatus having the highest priority level, which is the candidate apparatus that is usually used, the playback apparatus is able to select another management source apparatus from which to acquire the piece of key information. This provides a system that enables reliable acquisition of key information.

Here, the content playback apparatus may be connected over a network to each of the candidate apparatuses, and the acquisition-destination determination unit may read one of the pieces of candidate information at a time, attempt to establish communication with the candidate apparatus shown by the read piece of candidate information, and when communication is able to be established, select the read piece of candidate information as the one piece of candidate information.

According to the stated structure, the content playback apparatus can select a candidate apparatus with which communication is able to be performed to be the management source apparatus, and therefore the piece of key information can be acquired reliably.

Here, one of the management source apparatuses may be a secure IC card and be connected to the content playback apparatus, among the pieces of management source information, a piece of management source information that corresponds to the IC card may show the IC card as the management source apparatus, and the key information acquisition unit may judge whether the acquired piece of management source information shows the IC card, and when the judgment is affirmative, acquire the piece of key information from the IC card.

According to the stated structure, the secure IC card can be designated as the management source apparatus. This provides a system in which the secure IC card can be sold with the piece of key information recorded thereon as rights to play the encrypted content recorded on the recording medium.

Here, one of the management source apparatuses may be a server apparatus and be connected to the content playback apparatus over a network, among the pieces of management source information, a piece of management source information corresponding to the server apparatus may show the server apparatus as the management source apparatus, and the key information acquisition unit may judge whether the acquired piece of management source information shows the server apparatus, and when the judgment is affirmative, acquire the piece of key information from the server apparatus over the network.

According to the stated structure, the playback apparatus can designate a server apparatus that it is connected to over a network to be the management source apparatus.

Here, the network may be an internet, the piece of management source information corresponding to the server apparatus may be an IP address that is an address of the server apparatus on the internet, and the key information acquisition unit may judge whether the acquired piece of management information is an IP address, and when the acquired piece of management information is judged to be an IP address, acquire the piece of key information over the network from the server apparatus whose address in the IP address.

According to the stated structure, the management source apparatus that manages the piece of key information can be designated according to an IP address.

Here, the content playback apparatus may include a CPU and a memory, the memory storing a content playback program and a key information management program, the content playback apparatus operating as a content playback apparatus by the CPU operating according to the content playback apparatus program, and the content playback apparatus operating as a key management module by the CPU operating according to the key information management program, the memory may include a management area and a free area, the management area being readable only by the key management module, and the free area being writable by the key management module and readable by the content playback apparatus, the piece of key information may be stored in advance in the management area, one of the management source apparatuses may be the key management module, among the pieces of management source information, a piece of management source information corresponding to the key management module may identify the key management module, the key management module may read the piece of key information from the management area, and write the read piece of key information to the free area, and the key information acquisition unit may judge whether the acquired piece of management source information shows the key management module, and when the judgment is affirmative, acquire the piece of key information by reading the piece of key information that has been written to the free area by the key management module.

According to the stated structure, the CPU and the memory are shared by the content playback apparatus and the key management module, and therefore an apparatus can be constructed with less cost than if the CPU and the memory were not shared.

Here, one of the management source apparatuses may be a secure IC card and be connected to the content playback apparatus via a bus, another one of the management source apparatuses may be a server apparatus and be connected to the content apparatus over a network, the content playback apparatus may include a CPU and a memory, the memory storing a content playback program and a key information management program, the content playback apparatus operating as a content playback apparatus by the CPU operating according to the content playback apparatus program, and the content playback apparatus operating as a key management module by the CPU operating according to the key information management program, the memory may include a management area and a free area, the management area being readable only by the key management module, and the free area being writable by the key management module and readable by the content playback apparatus, the piece of key information may be stored in advance in the management area, yet another one of the management source apparatuses may be the key management module, among the pieces of management source information, a piece of management source information corresponding to the IC card may show the IC card as the management source apparatus, among the pieces of management source information, a piece of management source information corresponding to the server apparatus may show the server apparatus as the management source apparatus, among the pieces of management source information, a piece of management source information corresponding to the key management module may show the key management module as the management source apparatus, and the key information acquisition unit may include: a judgment sub-unit operable to judge which of the IC card, the server apparatus, and the key management module is shown by the acquired piece of management source information; an acquisition sub-unit operable to (a) when the IC card is judged to be shown by the acquired piece of management source information, acquire the piece of key information from the IC card, (b) when the server apparatus is judged to be shown by the acquired piece of management source information, acquire the piece of key information from the server apparatus over the network, and (c) when the key management module is judged to be shown by the acquired piece of management source information, acquire the piece of key information from the key management module by reading the piece of key information that has been written to the free area from the free area.

According to stated structure, the piece of key information relating the piece of encrypted content can be acquired from the one of the IC card, the server apparatus and the key management module that is shown by the piece of management source information and that performs playback control management that is appropriate to the piece of encrypted content.

Furthermore, the present invention is a content playback method used in a content playback apparatus that decrypts encrypted content recorded on a recording medium, thereby obtaining content, and plays the content, the recording medium having recorded thereon a plurality of pieces of encrypted content respectively in correspondence with a plurality of pieces of management source information, each piece of management source information showing, from among a plurality of management source apparatuses, a management source apparatus that manages usage of the corresponding piece of encrypted content, the content playback method including the steps of: a designation acquisition step of acquiring a designation of one of the pieces of encrypted content; a management source acquisition step of acquiring, from among the pieces of management source information recorded on the recording medium, a piece of management source information that corresponds to the designated piece of encrypted content; a key information acquisition step of acquiring, from the management source apparatus shown by the acquired piece of management source information, a piece of key information that shows usage permission for the designated piece of encrypted content; a decryption step of generating a content key based on the acquired piece of key information, and generating a piece of content by decrypting the designated piece of encrypted content with use of the generated content key; and a playback step of playing the generated piece of content.

Furthermore, the present invention is a computer program used in a content playback apparatus that decrypts encrypted content recorded on a recording medium, thereby obtaining content, and plays the content, the recording medium having recorded thereon a plurality of pieces of encrypted content respectively in correspondence with a plurality of pieces of management source information, each piece of management source information showing, from among a plurality of management source apparatuses, a management source apparatus that manages usage of the corresponding piece of encrypted content, the computer program including the steps of: a designation acquisition step of acquiring a designation of one of the pieces of encrypted content; a management source acquisition step of acquiring, from among the pieces of management source information recorded on the recording medium, a piece of management source information that corresponds to the designated piece of encrypted content; a key information acquisition step of acquiring, from the management source apparatus shown by the acquired piece of management source information, a piece of key information that shows usage permission for the designated piece of encrypted content; a decryption step of generating a content key based on the acquired piece of key information, and generating a piece of content by decrypting the designated piece of encrypted content with use of the generated content key; and a playback step of playing the generated piece of content.

Furthermore, the present invention is a computer-readable recording medium on which is recorded the aforementioned computer program.

Furthermore, the present invention is a recording medium having recorded thereon (i) a plurality of pieces of encrypted content respectively in correspondence with (ii) a plurality of pieces of management source information, each piece of management information showing, from among a plurality of management source apparatuses, a management source apparatus that manages usage of the corresponding piece of encrypted content.

According to the stated structure, the piece of key information for the piece of encrypted content is acquired not from a fixed management source apparatus, but from a management source apparatus shown by the piece of management source information corresponding to the piece of encrypted content written on the recording medium. Therefore, in a case of a plurality of pieces of content that are subject to different playback control management being recording on one recording medium, the pieces of encrypted content can be played and also be protected from illegal usage, based on the respective playback control management performed by the respective management source apparatuses.

Furthermore, the present invention is a key relay apparatus that relays key information showing usage permission for encrypted content recorded on a recording medium, the key relay apparatus including: a request reception unit operable to receive, from a content playback apparatus that performs reading from the recording medium, (i) a piece of content designation information that designates a piece of the encrypted content, and (ii) a piece of key management apparatus information that shows a key management apparatus that manages key information; a key information acquisition unit operable to acquire, from key management apparatus shown by the piece of key management apparatus information, a piece of key information that corresponds to the received piece of content designation information; and a key information transmission unit operable to transmit the acquired piece of key information.

Here, at least one of the management source apparatuses may include a key relay apparatus that relays key information and a key management apparatus that manages key information, among the pieces of management source information recorded on the recording medium, at least one piece of management source information that shows the at least one management source apparatus that includes the key relay apparatus and the key management apparatus may be information that includes (i) key relay apparatus information that shows a key relay apparatus and (ii) key management apparatus information that shows a key management apparatus, the key relay apparatus may receive, from the content playback apparatus, (i) a piece of content designation information that designates one of the pieces of encrypted content and (ii) a piece of key management apparatus information, transmit the piece of content designation information to the key management apparatus shown by the piece of key management information, receive, from the key management apparatus to which the piece of content designation information was transmitted, a piece of key information that corresponds to the piece of content specification information, and transmit the received piece of key information to a content playback apparatus, and the key management apparatus may receive the piece of content designation information, and transmit the piece of key information corresponding to the content designation information to the key relay apparatus.

According to the stated structure, the content playback apparatus acquires the piece of key information from a key management apparatus that is a different apparatus to the key relay apparatus. Therefore, even if the content playback apparatus cannot directly communicate with the key management apparatus, the piece of key information can be acquired from the key management apparatus via the key relay apparatus. Furthermore, if access to the key management apparatus is restricted to the key relay apparatus only, the key management apparatus is more secure than if it were able to be accessed by both the key relay apparatus and the content playback apparatus.

BRIEF DESCRIPTION OF THE DRAWINGS

FIG. 2 shows an outline of the structure of a playback apparatus and information recorded on a recording medium;

FIG. 3 shows an example of a playback control information table recorded on the recording medium;

FIG. 5 shows an example of a key control information table recorded on the recording medium;

FIG. 6 shows an example of a medium unique information table recorded on the recording medium;

FIG. 7 shows an example of a content key information table recorded in a key storage unit;

FIG. 9 shows an example of a key information table stored by a key storage unit of the license server;

FIG. 10 shows an example of a usage condition information table stored by a usage condition storage unit of the license server;

FIG. 12 shows an example of a rights information table stored by a rights storage unit of the license management client A;

FIG. 13 shows the format of a communication message transmitted between the license server and the license management client A;

BEST MODE FOR CARRYING OUT THE INVENTION

The following describes a content playback system 1 as an embodiment of the present invention.

Overview of Structure of Content Playback System 1

Figure 1:
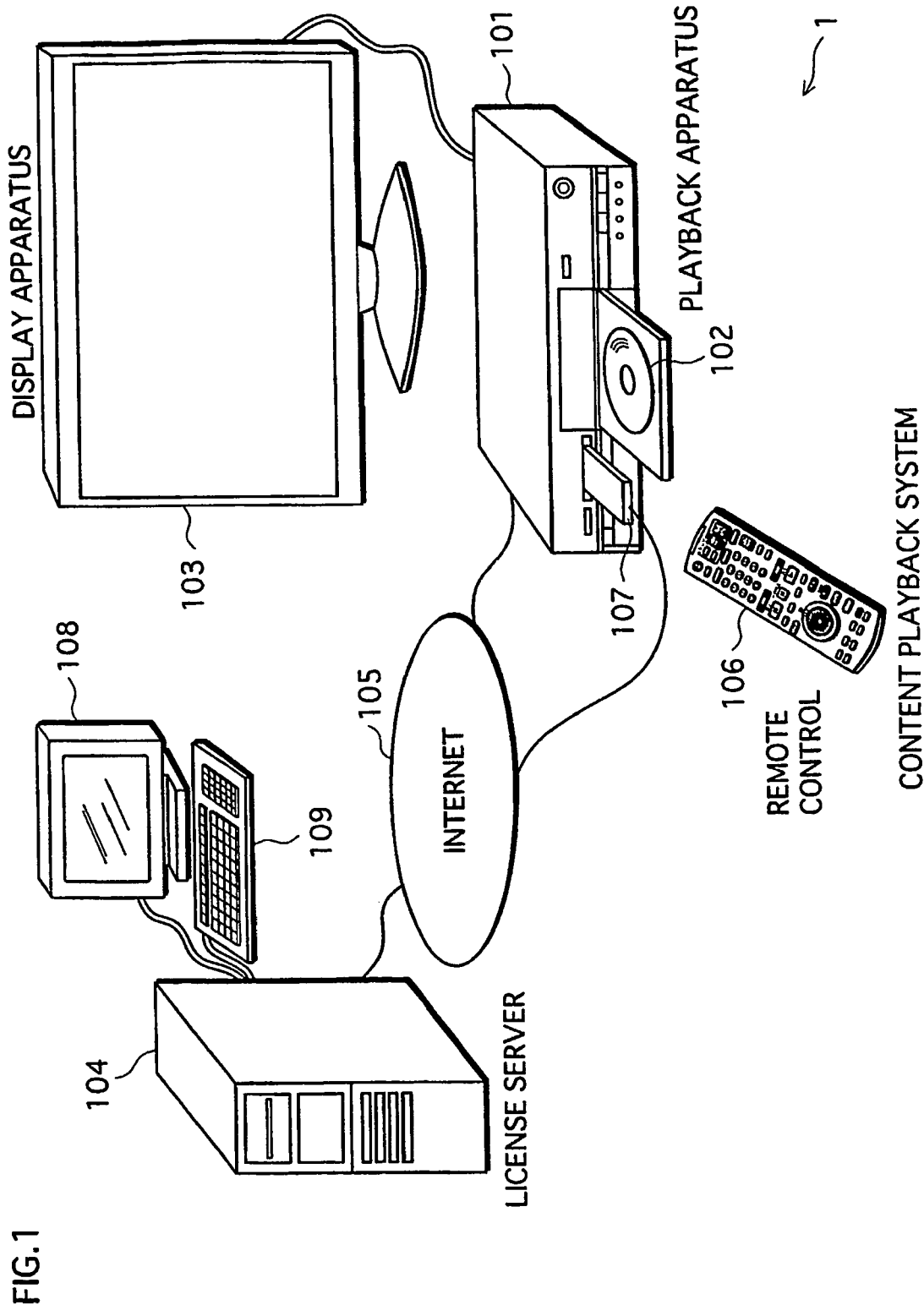
FIG. 1 shows an outline of the structure of a content playback system 1 of an embodiment of the present invention.

The content playback system 1, as shown in FIG. 1, is composed of a playback apparatus 101 and a license server 104. A license management client A (107), which is a tamper-proof IC card, is mounted in the playback apparatus 101. The license management client A (107) has a communication function and connects to the Internet 105. The playback apparatus 101 and the license server 104, and the license server 104 and the license management client A (107) are connected over the Internet 105.

Connected to the playback apparatus 101 is a display apparatus 103 that is a television monitor or the like. A recording medium 102 that is a BD disc or the like is mounted in the playback apparatus 101 by a user. The playback apparatus 101 receives an operation instruction, which has been made by the user, from a remote control 106, and, in response to the operation instruction, plays content recorded in the recording medium 102.

Note that the content recorded in the recording medium 102 is in an encrypted state, and is provided with restrictions such as a playback time limit and a playback count. The playback apparatus 101 receives rights information from the license server 104 and the license management client A (107) according to an operation instruction from the user, and, based on the rights information, decrypts the encrypted content and plays the content within the scope of the playback time limit and playback count restrictions.

The license server 104 and the license management client A (107) respectively manage rights information used when playing the content recorded in the recording medium 102. The playback apparatus 101 uses information recorded in the recording medium 102 to judge which of the rights information held by the license server 104 and the rights information held by the license management client A (107) to acquire.

Structure of Recording Medium 102

Pre-recorded in the recording medium 102, as shown in FIG. 2, are a playback control information table 211, encrypted content 212A to 212G, a key control information table 213, a medium unique information table 214, and a package identifier 210. The playback control information table 211, the encrypted content 212A to 212G, the key control information table 213, the medium unique information table 214, and the package identifier 210 together compose one compound content.

(1) Package Identifier 210

A package identifier is information that uniquely specifies the contents of a content group included on a recording medium. One package identifier is set per recording medium. For instance, a package identifier may be information such as "Japanese Top 50 Hits 2003" or "Director XX Movie Collection". The package identifier 210, whose contents are "Pack-ID-0001", is stored on the recording medium 102 as the package identifier thereof.

(2) Playback Control Information Table 211

The playback control information table 211, as shown in the example in FIG. 3, includes seven pieces of playback control information 251 to 257. Each of the pieces of playback control information 251 to 257 corresponds to a different one of the encrypted content 212A to 212G recorded in the recording medium 102. These seven pieces of playback control information included in the playback control information table 211 stipulate an order for decrypting and playing the encrypted content 212A to 212G. Each piece of playback control information 251 to 257 includes a playback number, a content name, a next playback number, an alternative playback number, corresponding rights method information, a connection-destination type, and acquisition-destination type, and a priority level. Note that there are pieces of playback control information that do not included a next playback number, an alternative playback number, corresponding rights method information, a connection-destination type, an acquisition-destination type, and a priority level. Furthermore, there are pieces of playback control information that include a plurality of groups of corresponding rights method information, connection-destination type, acquisition-destination type, and priority level.

Playback Number

The playback number included in each piece of playback control information is an index number for uniquely identifying the piece of playback control information. The playback numbers commence at "1", and increase by "1" with each piece of playback control information. For instance, the piece of playback control information 251 includes a playback control number 261 "1" which uniquely identifies the piece of playback control information 251. The piece of playback control information 252 includes a playback number 271 "2" which uniquely identifies the piece of playback control information 252.

Content Name

The content name included in each piece of playback control information is identification information for identifying the encrypted content corresponding to the piece of playback control information, and, specifically, is a file name that uniquely identifies the encrypted content. The encrypted content is recorded as one file on the recording medium 102.

Next Playback Number

The next playback number included in each piece of playback control information is a playback number identifying a piece of playback control information corresponding to encrypted content that should be decrypted and played next when decryption and playback of the encrypted content corresponding to the piece of playback control information is complete. The next playback number is not designated when no encrypted content to be decrypted and played next exists.

For instance, in FIG. 3, since the piece of playback control information 251 includes the next playback number 263 "2", when decryption and playback of the encrypted content identified by the content name 262 "Opening.mpg" is complete, decryption and playback of the encrypted content corresponding to the piece of playback control information 252 identified by the next playback number 263 "2" commences, in other words, decryption and playback of the encrypted content identified by the content name "Trailer.mpg" included in the piece of playback control information 252 commences.

Alternative Playback Number

The alternative playback number included in each piece of playback control information shows a playback number identifying a piece of playback control information corresponding to encrypted content that should be decrypted and played as an alternative when decryption and playback of the encrypted content shown by the next playback number in the same piece of playback control information is unable to be played.

For instance, in FIG. 3, the piece of playback control information includes the next playback number 273 "3" and the alternative playback number 274 "4". Therefore, after decryption and playback of the encrypted content identified by the content name 272 "Trailer.mpg" is complete, if the encrypted content corresponding to the piece of playback control information 253 identified by the next playback number 273 "3", in other words when the encrypted content identified by the content name "Movie.mpg" is unplayable, the encrypted content corresponding to the playback control information identified by the alternative playback number 274 "4", in other words, the encrypted content identified by the playback content name "Warning.mpg", is decrypted and played.

Furthermore, when no alternative playback number is included in a piece of playback control information, the encrypted content shown by the next playback number is forcedly decrypted and played, regardless of whether playback of the encrypted content is permitted.

Corresponding Rights Method Information

The corresponding rights method information included in each piece of playback control information is information specifying at least one rights method assigned to the encrypted content corresponding to the piece of playback control information when the encrypted content is encrypted with a rights key or a composite key (described later).

Here, the corresponding rights method shows a method for generating rights with respect to a content. For instance, method A is a method for generating rights based on a maximum playback count with respect to the content, and method B is a method for generating rights based on a playback time limit permitted with respect to the content.

For instance, when the method A is assigned to the content, the corresponding rights method information has a value "01", when the method B is assigned to the content, the corresponding rights method information has a value "10", and when both the method A and the method B are assigned to the content, the corresponding rights method information has a value of "11". Furthermore, when a corresponding rights method is not assigned to the content, the value of the corresponding rights method is "00".

Since the corresponding rights method information 265 shown in FIG. 3 is "00", a corresponding rights method is not assigned to the content corresponding to the piece of playback control information that includes the corresponding rights method information 265.

The corresponding rights method information 291 is "01", meaning that the method A is allocated to the content corresponding to the piece of playback control information included in the corresponding rights method information 291. Therefore, rights generated according to the method A are used with respect to usage of the content.

Furthermore, the piece of playback control information 257 includes two pieces of corresponding rights method information: corresponding rights information 292 having a value "01" and corresponding rights information 293 having a value "10". These two pieces of corresponding rights method information are used in descending order of priority levels (described later).

Connection-Destination Type and Acquisition-Destination Type

The connection-destination type is information that, in combination with the corresponding rights method information, specifies a connection-destination for acquiring a rights key. The acquisition-destination type is information that, in combination with the corresponding rights method information, specifies an acquisition-destination for acquiring a rights key.

For instance, in the piece of playback control information 256, "01 (method A)" is designated in the corresponding rights method 285, "client A" is designated in the connection-destination type 286, and "server" is designated in the acquisition-destination type 287. When the playback apparatus 101 acquires a rights key with respect to the content, the playback apparatus 101 connects to the license management client A (107) shown by the connection-destination type 286 "client A" that corresponds to the method A, and acquires the rights key from the license server 104 shown by the acquisition-destination type 287 "server" via the license management client A (107).

The system can be structured flexibly due to the advantage of being able to designate different apparatuses in the connection-destination type and the acquisition-destination type. For instance, suppose that the system is structured such that the license management client A (107) includes a function of performing secure communication with the license server 104 and so that it is necessary to purchase the license management client A (107), which is an IC card, in order for the playback apparatus 101 to play the content recorded in the recording medium 102. It is unnecessary for the playback apparatus 101 to have a communication function, and the user of the playback apparatus 101 can purchase the license management client A (107) and simply mount the license management client A (107) in the playback apparatus 101. This makes the system easy to use for the user.

Priority Level

Each priority level is information showing a priority order of what order to perform connection processing in when a plurality of sets corresponding rights methods information, a connection-destination type, an acquisition-destination type, and a priority level are set in a piece of playback control information.

For instance, the piece of playback control information 256 includes a set of corresponding rights method information 285, connection-destination type 286, acquisition-destination type 287, and a priority level that has a value "1", and a set of corresponding rights method information 295, connection-destination type 296, acquisition-destination type 297, and a priority level that has a value "2". The priority level 288, which has the smaller value, has priority over the priority level 298. Therefore, the playback apparatus 101 performs connection processing using the corresponding rights method information 285, the connection-destination type 286, and the acquisition-destination type 287 that correspond to the priority level 288. If this connection processing fails, the playback apparatus 101 performs connection processing using the corresponding rights method information 295, the connection-destination type 296, and the acquisition-destination type 297.

In the present embodiment, the assumed model is one in which, when the connection-destination and the acquisition-destination differ, the connection-destination type shows the license management client A (107), and the acquisition-destination type is the license server 104. A model where the connection-destination is the license server 104 and the acquisition-destination is the license management client contents is not assumed.

Playback Example

Figure 4:
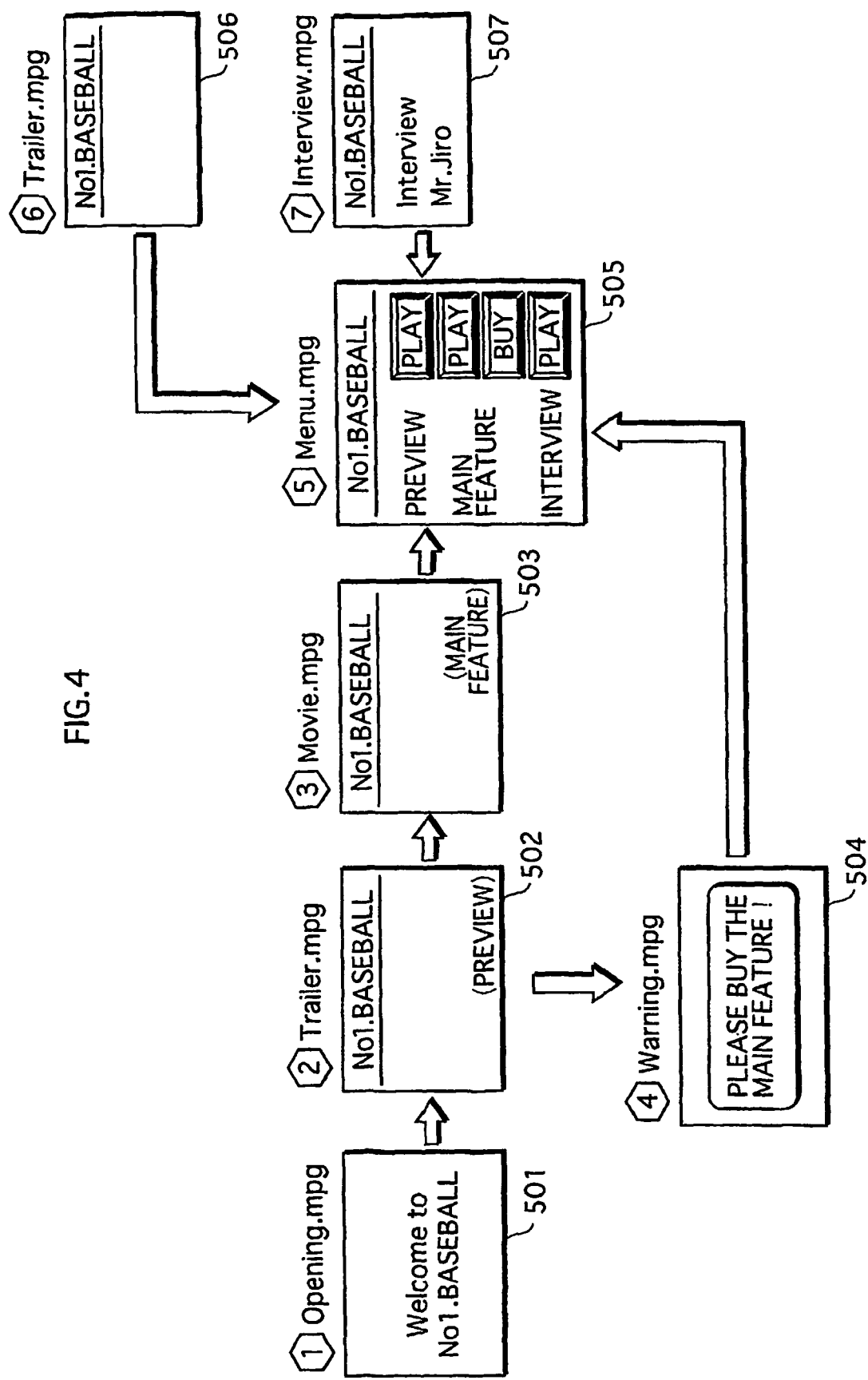
FIG. 4 shows a playback example of content following a playback order shown in the playback control information table.

FIG. 4 shows a playback example of the playback apparatus 101 playing content according to the playback order shown in the playback control information table 211.

Using the playback control information table 211, as shown in FIG. 4, video 501 corresponding to the playback number 261 "1" is played, and then video 502 is played. When playback of video 502 is complete, video 503 is played if playback of video 503 is possible, and then video 505 is played. If playback of video 503 is not possible, video 504 is played. Furthermore, depending on the conditions, video 506 and 507 are played. Here, the video 501 to 507 corresponds to the pieces of playback control information 251 to 257 shown in FIG. 3.

(3) Encrypted Content 212A to 212G

Each of encrypted content 212A to 212G composes one file on the recording medium 102.

Each encrypted content 212A to 212G is the same in terms of data structure. Each encrypted content 212A to 212G is generated by applying an encryption algorithm to the payload of each packet in a transport stream, excluding the application field, of a transport stream obtained by multiplexing an MPEG 2 video stream and an MPEG 2 audio stream according to a multiplexing method stipulated by MPEG 2. Here, as one example, the encryption algorithm is an AES (Advanced Encryption Standard) encryption algorithm. Note that an encryption algorithm of another secret key encryption method may be used.

(4) Key Control Information Table 213

The key control information table 213, as shown as one example in FIG. 5, includes a plurality of pieces of key control information. Each piece of key control information corresponds to a different one of the encrypted content 212A to 212G recorded in the recording medium 102. Each piece of key control information includes a content name, content unique information, key generation information, playability information, copyability information, and a public key certificate.

Content Name

Each playback content name in the pieces of key control information is identification information for identifying the encrypted content corresponding to the piece of key control information, and as with the playback content name included in the playback control information table 211 shown in FIG. 3, shows the file name of the corresponding encrypted content.

Content Unique Information

Each content unique information in the pieces of key control information is used for generating a content key for decrypting the encrypted content corresponding to the piece of key control information.

Key Generation Information

The key generation information included in each of the pieces of key control information is instruction information for instructing a generation method when generating a key corresponding to the encrypted content corresponding to the piece of key control information, and has a value of "00", "01" or "10". The value "00" shows that the content key is generated using the medium key. The value "01" shows that the content key is generated using the composite key. The value "10" shows that the content key is generated using the rights key. Note that the medium key, the composite key and the rights key are described later.

Playability Information

The playability information included in each piece of key control information is information showing whether or not the content corresponding to the piece of key control information is able to be played, and has a value of either "1" or "0". The value "1" shows that corresponding content is able to played, and the value "0" shows that the corresponding content is not able to be played.

Note that the playability information is not limited to designating either playable or unplayable. For instance, the playability information may show the quality of playback. In such a case, "unplayable" may show playback at high quality and "playable" may show playback at low quality.

Copyability Information

The copyability information included in each of the pieces of key control information is information showing whether or not the content corresponding to the piece of key control information is able to be copied, and has a value of "01", "10", or "00". The values "01", "10", and "00" express "Once", "Free", and "Never", respectively. "Once" shows that only a one-generation copy of the content is possible, "Free" shows that the content is freely copyable, and "Never" shows that the content is not copyable.

Note that the copyability information is not limited to specifying Once, Free, and Never. For instance, information designating a copy quality or a copy-destination media may be included in the copyability information.

Public Key Certificate

Each public key certificate is information for verifying the signature of a message received from the acquisition-destination module specified by the "corresponding rights method information" and the "acquisition-destination type" corresponding to the same content name in the playback control information table 211, with respect to an item for which the key generation information is "10" (rights key) or "01" (composite key). Specifically, the public key certificate of the acquisition-destination module is set.

For instance, the piece of key control information 511 includes a public key certificate 515 "Pub-key-a001", and includes the public key corresponding to the device unique key of the license management client A (107) shown by the connection-destination type "Client A" corresponding to the same content name as the content name "Movie.mpg" included in the piece of key control information 511.

A cipher text encrypted using the public key included in the public key certificate 515 can be decrypted using the device unique key of the license management client A (107), and a cipher text encrypted using the device unique key of the license management client A (107) can be decrypted using the public key included in the public key certificate 515.

Furthermore, a signature generated using the public key certificate included in the public key certificate 515 is judged to be valid when verified using the device unique key of the license management client A (107), and a signature generated using the device unique key of the license client A (107) is judged to be valid when verified using the public key included in the public key certificate 515.

Furthermore, the piece of key control information 512 includes two public key certificates: a public key certificate 516 "Pub-key-a001" and a public key certificate 517 "Pub-key-a002", the two public key certificates corresponding to two acquisition-destination types that include the content name 282 "Making.mpg" that is the same content name "Making.mpg" of the piece of key control information 512.

In other words, the public key certificate 516 "Pub-key-a001" corresponds to the acquisition-destination type 287 "server" and the public key certificate 517 "Pub-key-a002" corresponds to the acquisition-destination type 297 "client B".

(5) Medium Unique Information Table 214

The medium unique information table 214, as one example shown in FIG. 6, is composed of a plurality of pieces of medium unique information. Each piece of medium unique information is composed of device unique information and an encrypted medium key.

Device Unique Information

The device unique information in each piece of medium unique information is information uniquely assigned to the playback apparatus corresponding to the piece of medium unique information and is inherent to the playback apparatus.

Encrypted Medium Key

The encrypted medium key in each piece of medium unique information is generated by applying an encryption algorithm to a medium key with use of the device unique key assigned to the playback apparatus corresponding to the piece of medium unique information. As one example, an AES encryption algorithm is used. Note that an encryption algorithm of another secret key encryption method may be used. The medium key is a key assigned to the recording medium 102.

In this way, the medium unique information table 214 includes encrypted medium keys generated respectively for each of playback apparatuses. If a specific playback apparatus is made invalid due to hacking or the like, a medium unique information table is generated that does not included the device unique information and the encrypted medium key corresponding to the specific playback apparatus, and the generated medium unique information table is written to recording media. This prevents the content being illegally played by an invalid device.

Structure of Playback Device 101

The playback device 101, as shown in FIG. 2, is composed of a content playback unit 200, an input reception unit 221, a display control unit 222, a key acquisition intermediation unit 223, and a power unit (not illustrated) that supplies power to compositional units. The content playback unit 200 is a tamper-resistant, secure LSI (Large Scale Integration), and is composed of a reading unit 201, a playback control unit 202, a decryption unit 203, a key acquisition control unit 204, a medium key generation unit 205, a key storage unit 206, a device information storage unit 207, and a communication unit 208.

The playback unit 101 is, specifically, a computer system composed of a CPU, a ROM, a RAM, a work memory, a flash memory, a BD drive, a video adapter, a network adapter, and the like. Computer programs are stored in the RAM, and the playback apparatus 101 achieves its functions by the CPU operating according to the computer program.

Furthermore, the reading unit 201 is composed of the BD drive. The input reception unit 221 receives operational instruction according to infrared rays from the remote control 106. The display control unit 222 is composed of the video adapter. The key storage unit 206 and the device information storage unit 207 are composed of the flash memory. The control unit 208 is composed of the network adapter.

(1) Device Information Storage Unit 207 and Key Storage Unit 206

Device Information Storage Unit 207

The device information storage unit 207, as shown in FIG. 2, pre-stores device unique information 231, a device unique key 232, and a public key certificate 233.

The device unique information 231 is uniquely assigned to the playback apparatus 101 and is inherent to the playback apparatus 101. The device unique key 232 is key information uniquely assigned to the playback apparatus 101. The public key certificate 233 is pre-issued by an issuing authority, and includes the public key of the playback apparatus 101. A ciphertext encrypted using the public key in the public key certificate 233 can be decrypted using the device unique key 232, and a cipher text encrypted using the device unique key 232 can be decrypted using the public key in the public key certificate 233. Furthermore, a signature generated using the public key in the public key certificate 233 is judged to be valid when verified using the device unique key 232, and a signature generated using the device unique key 232 is judged to be valid when verified using the public key in the public key certificate 233.

Key Storage Unit 206

The key storage unit 206 stores a content key information table 121, as shown as one example in FIG. 7, that is acquired according to a content key acquisition process 1 described later. The content key information table 121 is composed of a plurality of pieces of content key information, each of which includes a package identifier, a content name, a content key, a playback count, a playback time limit, and a playback control condition. Note that there are pieces of content key information that do not include a playback count and a playback time limit.

The package identifier in each content key information is information uniquely specifying the contents of a content group in a recording medium such as the recording medium 102. One package identifier is set per recording medium.

The content name in each content key information is information for specifying the encrypted content corresponding to the content key information. As with the content names in the playback control information table 211 shown in FIG. 3, each content name is a file name that uniquely identifies the corresponding encrypted content.

The content key in each content key information is key information used for decrypting the encrypted content corresponding to the content key information. The content key is described later.

The playback count in each content key information is a maximum number of times that the content corresponding to the content key information is permitted to be played. The content may be played an unlimited number of times when there is no particular specification of the playback count.

The playback time limit in each content key information shows the last day of the period of time for which the content corresponding to the piece of key information is permitted to be played. The content may be played for an unlimited period of time when there is no particular specification of the playback time.

The playback control condition in each content key information is information used to control usage of the content.

In the present embodiment, the playback control condition shows the quality of a video stream or audio stream when played. A value "11" shows content playback at high image and audio quality, a value "10" shows content playback at high image and low audio quality, a value "01" shows content playback with low image and high audio quality, and a value "00" shows content playback with low image and low audio quality. Furthermore, a value "22" shows that the playback control condition is invalid.

With the playback control condition, it is possible to forcedly instruct such that, for example, HD quality content is played having been down-converted to SD quality or QCIF (Quarter Common Intermediate Format).

(2) Playback Control Unit 202

The playback control unit 202 performs control relating to playback of content.

Overall Control of Content Playback

The playback control unit 202 receives, from the input reception unit 221, a playback instruction for content recorded in the recording medium 102, and receives a signal from the reading unit 201 that indicates that it has detected that the recording medium 102 has been loaded.

After (a) receiving power supply from the power unit and then either (b) receiving a playback instruction from the input reception unit 221, or (c) receiving a signal showing detection of loading of the recording medium 102 from the reading unit 201, the playback control unit 202 controls the reading unit 201 such that the reading unit 201 reads the piece of playback control information that includes the playback number "1" from the playback control information table 211 recorded in the recording medium 102. Next, the playback control unit 202 extracts the content name from the read playback control information, and executes a content key acquisition process 1 described later.

Here, the content key acquisition process 1 is processing for acquiring a content key for decrypting encrypted content that is recorded in the recording medium 102 and that corresponds to the content name.

When the content key is unable to be acquired in the content key acquisition process 1, the processing ends. When the content key is able to be acquired, content playback processing 1, which is described later, is executed.

Here, the content playback process 1 is processing for decrypting the encrypted content that is recorded in the recording medium 102 and that corresponds to the content name, with use of the content key acquired according to the content key acquisition process 1, and playing the decrypted content.

After executing the content playback process 1, when the playback control unit 202 does not receive a playback continue instruction based on a user instruction from the input reception unit 211, the playback control unit 202 ends the processing. When the playback control unit 202 does receive a playback continue instruction, the playback control unit 202 extracts the next playback number from the piece of playback control information corresponding to the content that has been played directly previously, and further extracts the piece of playback control information that corresponds to the extracted next playback number, from the playback control information table 211.

The playback control unit 202 extracts the content name included in the piece of playback control information corresponding to the next playback number, and performs content key acquisition, content decryption, and playback with respect to the content identified by the content name, in the same manner as for the previously-played content.

The playback control unit 202 repeatedly performs the described content key acquisition, content decryption, and playback until no next playback number relating to content that has been played can be extracted.

Control in Content Acquisition Process 1

The playback control unit 202 extracts corresponding rights method information that corresponds to the content name of the content for which the content key is to be acquired, and when the corresponding rights method information has a valid value other than "00", in other words when a rights key is required, performs a rights key acquisition process which is described later.

The rights key acquisition process is processing for acquiring a rights key that is used to generate the content key.

When a rights key is unable to be acquired in the rights key acquisition processing, the playback control unit 202 re-executes the rights key acquisition process. When a rights key is acquired, the playback control unit 202 extracts the package identifier 210 corresponding to the content name from the recording medium 102. The playback control unit 202 transmits the rights key, the package identifier, and the content name to the key acquisition control unit 204, and, as a response, receives a content key storage completion message showing whether or not the content key was able to be stored, from the key acquisition control unit 204.

When the corresponding rights method information does not have a valid value, in other words, when a rights key is not required, the playback control unit 202 extracts the package identifier from the piece of playback control information and transmits the extracted package identifier and the content name to the key acquisition control unit 204.

Processing in Rights Key Acquisition Process

The playback control unit 202 reads, from the playback control information table 211, the corresponding rights method information, the connection-destination type, and the acquisition-destination type corresponding to the content name of the content for which a the content key is to be acquired.

When a plurality of sets of corresponding rights method information, connection-destination type, acquisition-destination type and priority level are in correspondence with a plurality of priority levels in the piece of playback control information corresponding to the content name, the playback control unit 202 reads the corresponding rights method information, connection-destination type and acquisition-destination type corresponding to the priority level having the lowest value.

The playback control unit 202 reads the public key certificate 233 of the playback apparatus 101 from the device information storage unit 207, and transmits the package identifier, the content name, the corresponding rights method information, the connection-destination type, the acquisition-destination type, and the public key certificate 233 to the key acquisition intermediation unit 223.

As a response from the key acquisition intermediation unit 223, the playback control unit 202 receives a signed message that includes an encrypted rights key, and transmits the received signed message and the content name to the key acquisition control unit 204.

Processing in Content Playback Process

The playback control unit 202 transmits the package identifier and the content name corresponding to the content to be played to the decryption unit 203.

(3) Key Acquisition Control Unit 204

Processing in Content Key Acquisition Process 1

When a rights key is required for playback of the content, the key acquisition control unit 204 receives the rights key, the package identifiers, and the content name from the playback control unit 202.

When a rights key is not required, the key acquisition control unit 202 receives the package identifier and the content name from the playback control unit 202, extracts the key generation information corresponding to the received content name from the key control information table via the reading unit 201, and acquires the medium key by executing a medium key acquisition process which is described later.

The key acquisition control unit 204 extracts the key generation information corresponding to the received package identifier and the content name from the key control information table 213 via the reading unit 201. When the extracted key generation information has a value "01" showing composite key, the key acquisition control unit 204 generates a content key with use of the received rights key and the medium key acquired in the medium key acquisition process.

When the extracted key generation information has a value "00" showing medium key, the key acquisition control unit 204 generates a content key with use of the medium key and the content unique information included in the key control information. When the extracted key generation information has a value "10" showing rights key, the key acquisition control unit 204 generates a content key with use of the rights key and the content unique information included in the piece of key control information.

Here, when the key generation information shows composite key, the content key is generated by concatenating the medium key and the rights key in the stated order, and applying a one-way function to the resultant concatenated data.

Content key=SHA-1 (medium key‖rights key)

When the key generation information shows rights key, the control key is generated by concatenating the rights key and the content unique information in the stated order, and applying a one-way function to the resultant concatenated data.

Content key=SHA-1 (rights key‖content unique information)

When the key generation information shows medium key, the control key is generated by concatenating the medium key and the content unique information in the stated order, and applying a one-way function to the resultant concatenated data.

Content key=SHA-1 (medium key‖content unique information)

After generating the content key, the key acquisition control unit 204 transmits content key storage completion notification to the playback control unit 202.

Processing in Rights Key Acquisition Process

The key acquisition control unit 204 receives the content name and the signed message from the playback control unit 202.

Included in the signed message are the public key certificate of the apparatus identified by the acquisition-destination type, and the encrypted rights key.

The key acquisition control unit 204 reads the public key certificate corresponding to the content name from the key control information table 213, and extracts the public key from the public key certificate. Using the extracted public key certificate, the key acquisition control unit 204 verifies whether the signature of the received signed message is valid, and when the signature is valid, decrypts the encrypted rights key included in the signed message with use of the device unique key 232, thereby acquiring the rights key.

Processing in Medium Key Generation Process

In order to request generation of a medium key, the key acquisition control unit 204 transmits a generation instruction to the medium key generation unit 205.

Processing in Content Playback Process

The key acquisition control unit 204 receives a package identifier and a content name from the decryption unit 203, and transmits the content key that corresponds to the received package identifier and content name and that was held in the content key acquisition process.

Furthermore, when the key acquisition control unit 204 receives a package identifier, a content name, and a playback history from the decryption unit 203, the key acquisition control unit 204 reads the public key certificate 233 from the device information storage unit 207, and, with use of the device unique key 232, applies a signature to history information that includes the package identifier, the content name, the public key certificate 233 and the playback history, thereby generating signed history information. The key acquisition control unit 204 then transmits the generated signed history information to the key acquisition intermediation unit 223.

The key acquisition control unit 204 receives a signed update processing result from the key acquisition intermediation unit 223, as a response to the transmitted signed history information. The key acquisition control unit 204 verifies the signature of the received signed update result with use of the public key of the acquisition-destination module (the connection-destination in the case of the acquisition-destination type and the connection-destination type being identical) identified by the acquisition-destination type in the pieces of playback control information corresponding to the content name.

When the signature is valid, a predetermined process is performed according to the result of the update processing result included in the signed update processing result. For instance, when the processing result shows that processing ended normally, notification to this effect is displayed on the screen, thereby notifying the user.

When the signature is not valid, error processing is performed. For instance, in the error processing, it is determines that the connection-destination module or the acquisition-destination module cannot be trusted, and processing is performed for setting the connection-destination module as an unconnectable connection-destination module.

(3) Medium Key Generation Unit 205, Key Intermediation Unit 223, Decryption Unit 203

Medium Key Generation Unit 205

On receiving, from the key acquisition control unit 204, the key generation instruction showing generation of a key relating to content, the medium key generation unit 205 reads the device unique information 231 from the device information storage unit 207.

Next, the medium key generation unit 205 reads, from the medium unique information table 214, the piece of medium unique information that includes the device unique identifier that matches the device unique information 231, extracts the encrypted medium key from the read piece of medium unique information, and reads the device unique key 232 from the device information storage unit 207. The medium key generation unit 205 then decrypts the extracted encrypted medium key with use of the read device unique key 232, thereby generating a medium key, and outputs the generated medium key to the key acquisition control unit 204.

Here, when no piece of medium unique information that matches the device unique information of playback apparatus 101 is set in the medium unique information table 214, the medium key acquisition processing ends, and the content playback processing ends.

Key Acquisition Intermediation Unit 223

The key acquisition intermediation unit 223 includes a card reader which communicates with the license management client A (107) via a bus.

Processing in Content Key Acquisition Process 1

The key acquisition intermediation unit 223 receives a package identifier, a content name, corresponding rights method information, a connection-destination type, an acquisition-destination type, and the public key certificate 233 from the playback control unit 202, specifies the connection-destination module from the received connection-destination information, and transmits a rights key transmission request to the specified connection-destination module. The rights key transmission request includes the package identifier, the content name, the acquisition-destination type, the public key certificate 233, and the corresponding rights method information.

As a response, the key acquisition intermediation unit 223 receives a signed message from the connection-destination module, and transmits the received signed message to the playback control unit 202.

Processing in Content Playback Process

The key acquisition intermediation unit 223 reads the corresponding rights method information corresponding to the package identifier and the content name included in the signed history information, and the connection-destination, from the playback control information table 211. The key acquisition intermediation unit 223 specifies the connection-destination module from the read corresponding rights method information and connection-destination type, reads the package identifier and the acquisition-destination type corresponding to the content name from the playback control information table 211, and transmits the signed history information and the acquisition-destination type to the connection-destination module.

When a signed update processing result is received from the connection-destination module, the key acquisition intermediation unit 223 transmits the received signed update processing result to the key acquisition control unit 204.

Decryption Unit 203

The decryption unit 203 receives the package identifier and the content name from the playback control unit 202, transmits the package identifier and the content name to the key acquisition control unit 204, and receives a content key that corresponds to the package identifier and the content name, from the key acquisition control unit 204.

The decryption unit 203 reads the encrypted content corresponding to the content name from recording medium 102 via the reading unit 201, and decrypts the read encrypted content with the content key received from the key acquisition control unit 204.

The decryption unit 203 judges whether or not the playback control information has a valid setting. Specifically, the decryption unit 203 judges that the playback control condition is invalid when the value of the playback control condition is "22", and that the setting is valid when the value of the playback control condition is a value other than "22". When it is judged that the playback control condition is valid, the content is played with the picture quality and the audio quality shown in the playback control condition, while the playback history is recorded. When the setting is judged to be invalid, the content is played without any conversion of the picture quality or the audio quality, while the playback history is recorded.

Here, the playback history is a record of a playback count which is the number of times the content has been played. Specifically, the generated playback history shows, for instance, "playback count=1 (times)" or "playback time=2 (hours)".

After playback of the content has ended, the decryption unit 203 reads the playback count and playback time limit corresponding to the content name of the played content from the playback control information table, and when the playback count and the playback time limit show that playback is unlimited, judges that the usage condition type is stateless. Furthermore, when at least one of the playback count and the playback time limit does not show that playback is unlimited, the decryption unit 203 judges that the usage condition type is statefull.

When the usage condition type is stateless, the decryption unit 203 ends the processing. When the usage condition type is statefull, the decryption unit 203 transmits the package identifier and the content name and the recorded playback history corresponding to the played content to the key acquisition control unit 204.

(4) Input Reception Unit 221, Communication Unit 208, Reading Unit 201

Input Reception Unit 221

The input reception unit 221 receives an infrared ray from the remote control 106, extracts signals corresponding to the buttons from the received infrared ray, and outputs the extracted signals to the playback control unit 202.

Here, as one example, the extracted signal shows a playback instruction, and the input reception unit 221 outputs the playback instruction to the playback control unit 202.

Communication Unit 208

The communication unit 208 is connected to the license server 104 via the Internet 105, and performs communication of information with the license server 104.

The communication unit 208 performs user authentication with the license management client A (107), and when user authentication fails, does not perform communication with the apparatus with which authentication failed.

Reading Unit 201

The reading unit 201 reads information recorded in the recording medium 102, according to control by the playback control unit 202, the decryption unit 203, the key acquisition control unit 204, and the medium key generation unit 205, and outputs the read information to the playback control unit 202, the decryption unit 203, the key acquisition control unit 204, and the medium key generation unit 205, respectively.

Structure of License Server 104

Figure 8:
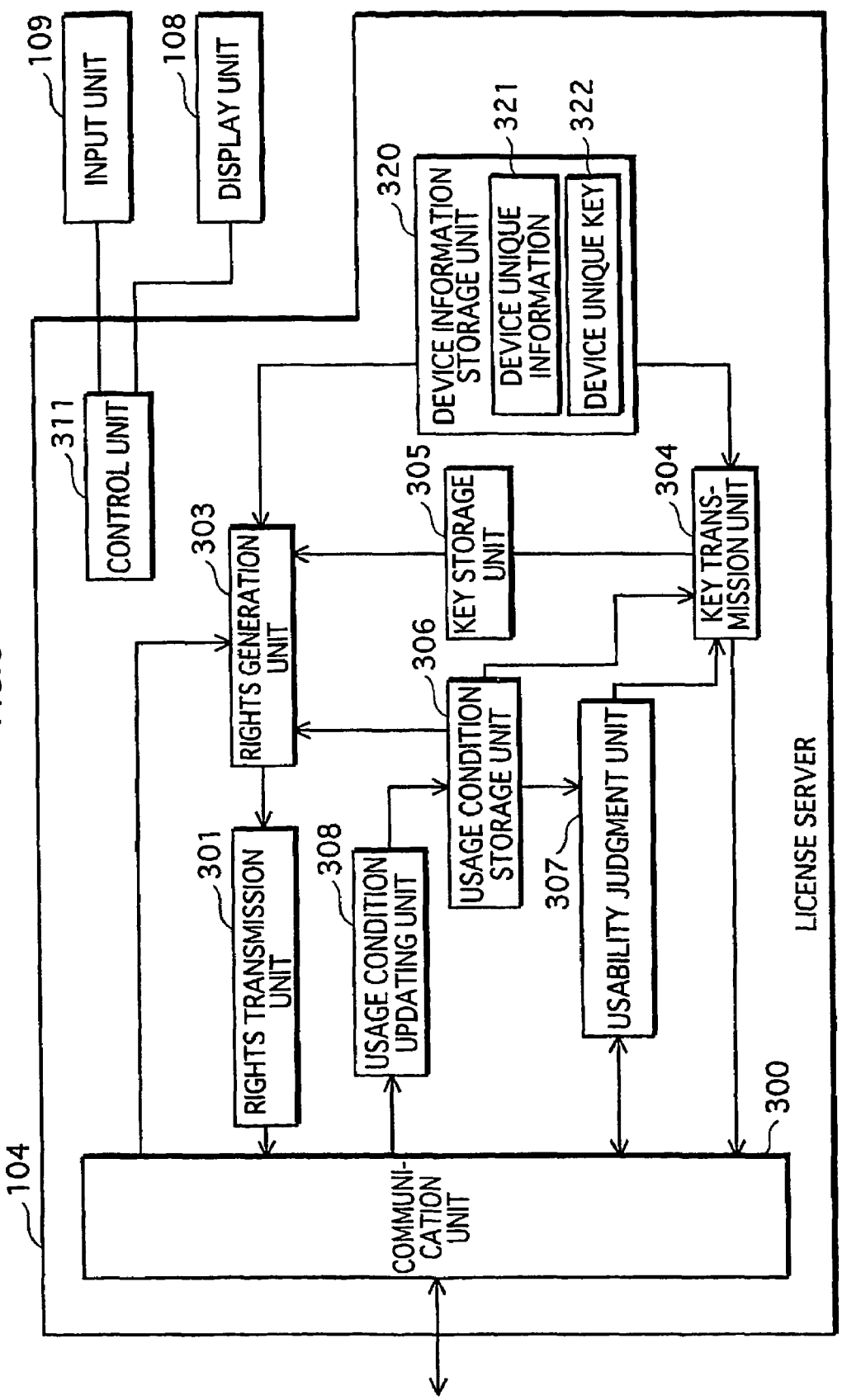
FIG. 8 shows the structure of a license server.

The license server 104, as shown in FIG. 8, is composed of a communication unit 300, a rights transmission unit 301, a rights generation unit 303, a key transmission unit 304, a key storage unit 305, a usage condition storage unit 306, a usability judgment unit 307, a usage condition updating unit 308, a control unit 311, and a device information storage unit 320. Furthermore, an input unit 109 and a display unit 108 are connected to the license server 104.

The license server 104 is, specifically, a microprocessor, a ROM, a RAM, a hard disk unit, a network adapter, a display unit, a keyboard, a mouse, and the like. Computer programs are stored in the RAM or the hard disk unit, and the compositional units of the license server 104 achieve their functions by the CPU operating according to the computer programs.

The device information storage unit 320, as one example shown in FIG. 8, pre-stores device unique information 321 and a device unique key 322.

The device unique information 321 is information that is uniquely assigned to and is inherent to the license server 104. Furthermore, the device unique key 322 is key information that is inherent to the license server 104.

Here, a ciphertext encrypted using the device unique key 322 can be decrypted using the public key included in the public key certificate "Pub-key-a003" or "Pub-key-b003" stored in the recording medium 102. A ciphertext encrypted using the public key included in the public key certificate "Pub-key-a003" or "Pub-key-b003," is able to be decrypted using the device unique key 322.

Furthermore, validity of a signature generated using the device unique key 322 can be verified using the public key included in the public key certificate "Pub-key-a003" or "Pub-key-b003" stored in the recording medium 102. Validity of a signature generated using the public key included in the public key certificate "Pub-key-a003" or "Pub-key-b003" can be verified using the device unique key 322.

The communication unit 300 is composed of the network adapter and a network adapter control program, and is connected to the playback apparatus 101 and the license management client A (107) via the Internet 105.

The communication unit 300 receives a rights acquisition instruction, a package identifier, a content name, and corresponding rights method information from the communication unit 419 of the license management client A (107), and performs user authentication with the communication unit 419 of the license management client A (107).

When the user authentication fails, the communication unit 300 determines that rights transmission is not permitted, and transmits a rights acquisition failure message to the rights acquisition unit 411 of the license management client A (107). When the user authentication succeeds, the communication unit 300 determines that rights transmission is permitted, and transmits the rights acquisition instruction, the package identifier, the content name, and the corresponding rights method information to the rights generation unit 303.

The communication unit 300 also performs user authentication with the playback apparatus 101 or the license management client A (107) when performing other communication, and when user authentication fails, does not perform communication with the apparatus with which authentication failed.

The key storage unit 305, as one example shown in FIG. 9, pre-stores a key information table.

The key information table is composed of a plurality pieces of key information corresponding respectively to the content. Each piece of key information is composed of a package identifier, a content name, and a rights key.

The package identifier included in each piece of key information is information uniquely specifying the content of the content group included in a recording medium such as the recording medium 102. One package identifier is assigned per recording medium.

The content name included in each piece of key information is information for specifying encrypted content corresponding to the piece of key information. As with the content names in the playback control information table 211 shown in FIG. 3, the content name is a file name that uniquely identifies the corresponding encrypted content.

The rights key included in each piece of key information is a key used in generating a content key corresponding to the encrypted content identified by the content name in the piece of key information. The content key is described later.

The usage condition storage unit 306, as shown as one example in FIG. 10, pre-stores a usage condition information table.

The usage condition information table is composed of a plurality of pieces of usage condition information that correspond respectively to the plurality of contents. Each piece of usage condition information is composed of a package identifier, a content name, a playback count, a playback time limit, and a playback control condition.

The playback count included in each piece of usage condition information is a maximum number of times that the content corresponding to the piece of usage condition information is permitted to be played. The content may be played an unlimited number of times when there is no particular specification of the playback count.

The playback time limit in each piece of usage condition information shows the last day of the period of time for which the content corresponding to the piece of usage condition information is permitted to be played. The content may be played for an unlimited period of time when there is no particular specification of the playback time.

The playback control condition in each piece of usage condition information is information used to control usage of the content.

In the present embodiment, the playback control condition shows the quality of a video stream or audio stream when played. A value "11" shows content playback with high image and audio quality, a value "10" shows content playback with high image and low audio quality, a value "01" shows content playback with low image and high audio quality, and a value "00" shows content playback with low image and low audio quality. Furthermore, a value "22" shows that the playback control condition is invalid.

With the playback control condition, it is possible to forcedly instruct such that, for example, HD quality content is played having been down-converted to SD quality or QCIF (Quarter Common Intermediate Format).

The usability judgment unit 307 receives a rights key proxy transmission request that is a rights key transmission request from the license management client A (107).

Included in the rights key proxy transmission request are a package identifier, a content name, the public key certificate 233 of the playback apparatus 101, and the corresponding rights method information.

The usability judgment unit 307 reads the playback count and the playback time limit corresponding to the package identifier and the content name included in the received rights key proxy transmission request, from the usage condition information table stored in the usage condition storage unit 306, and, using the playback count, the playback time limit, and the corresponding rights method information, judges whether or not the content is permitted to be used.

Specifically, when the corresponding rights method information shows "01 (method A)", the usability judgment unit 307 judges that the content is not permitted to be used if the playback times has a value "0", and judges that the content is permitted to be used if the playback times has a value other than "0".

When the corresponding rights method information shows "10 (method B)", the usability judgment unit 307 judges that the content is not permitted to be used if the present time exceeds the playback time period, and judges that the content is permitted to be used if the present time does not exceed the playback time period.

When the corresponding rights information shows "11 (method A and method B)", the usability judgment unit 307 judges that the content is not permitted to be used if at least the playback count is "0" or the present time exceeds the playback time limit, and judges that the content is permitted to be used in other cases.

When having judged that the content is not permitted to be used, the usability judgment unit 307 transmits unusability information, which shows that the content is not usable, to the key transmission unit 304. When having judged that the content is permitted to be used, the usability judgment unit 307 transmits the package identifier, the content name, and the public key certificate 233 of the playback apparatus 101 to the key transmission unit 304.

The key transmission unit 304 receives the package identifier, the content name, and the public key certificate 233 of the playback apparatus 101 from the usability judgment unit 307, and reads the rights key corresponding to the received package identifier and content name from the key storage unit 305.

Furthermore, the key transmission unit 304 reads the playback control condition corresponding to the received package identifier and content name from the content key information table 121.

The key transmission unit 304 extracts the public key of the playback apparatus 101 from the received public key certificate 233, and acquires an encrypted rights key by encrypting the read rights key with the public key.

The key transmission unit 304 generates a signed message by using the device unique key 321 stored in the device information storage unit 320, to sign the encrypted rights key and the read playback control condition, or to sign the unusability information in the case of unusability information being received from the usability judgment unit 307. The key transmission unit 304 then transmits the signed message via the communication unit 300 to the transmission-origin of the rights key proxy transmission request (here, the transmission origin is the license management client A (107) that is the connection-destination module).

The usage condition updating unit 308 receives signed history information from the connection-destination module.

The signed history information is generated by applying a signature to the history information that includes the package identifier, the content name, the public key certificate 233 and the playback history.

The usage condition updating unit 308 extracts the public key from the public key certificate 233 included in the signed history information, and, using the public key, verifies whether or not the signature of the signed history information is valid.

When the signature is not valid, the usage condition updating unit 308 sets "invalid signature" in the update processing result. When the signature is valid, based on the package identifier, the content name, and the corresponding rights method information included in the signed history information, the usage condition updating unit 308 specifies, from among the pieces of usage condition information stored in the usage condition storage unit 306, a piece of usage condition information that is to be updated, updates the specified piece of usage condition information based on the received playback history, writes the updated piece of usage condition information to the usage condition storage unit 306, and sets "update processing ended normally" in the update processing result.

Here, the update-target piece of usage condition information is "playback count" when the corresponding rights method information is "01", "playback time limit" when the corresponding rights method information is "10", and both "playback count" and "playback time limit" when the corresponding rights method information is "11".

For instance, when the playback count that is the usage condition in the piece of usage condition information is "5" and the playback history is "2", the playback count in the rights information is updated to "3".

Next, the usage condition updating unit 308 reads the device unique key 322 from the device information storage unit 320, acquires a signed update processing result by applying a signature to the update processing result using the device unique key 322, and transmits the signed update processing result to the connection-destination module.

The rights generation unit 303 receives the rights acquisition instruction, the package identifier, the content name, and the corresponding rights method information from the communication unit 300, reads the usage condition and playback control condition corresponding to the received package identifier, content name and corresponding rights method information, from the usage condition storage unit 306, and reads the rights key corresponding to the package identifier and the content name from the key storage unit 305.

Here, the usage condition is the playback count when the corresponding rights method information is "01 (method A)", the playback time limit when the corresponding rights method information is "10 (method B)", and both the playback count and the playback time limit when the corresponding rights method information is "11 (method A and method B)".

Furthermore, it is assumed that the rights generation unit 303 deletes the piece of usage condition information corresponding to the read package identifier and content name from the usage condition storage unit 306, and deletes the rights key corresponding to the package identifier and the content name from the key storage unit 305.

The rights generation unit 303 generates rights information from the package identifier, the content name, the rights key, the playback times, the playback time limit, and the playback control condition, and transmits the rights information to the rights transmission unit 301.

The rights transmission unit 301 receives the rights information from the rights generation unit 303, and transmits the rights information to the license management client A (107).

The input unit 109 receives an instruction from the operator of the license server 104, and outputs the received instruction to the instruction control unit 311.

The display unit 108 displays various types of information according to control by the control unit 311.

Structure of License Management Client A (107)

The following describes the internal structure of the license management client A (107).

Figure 11:
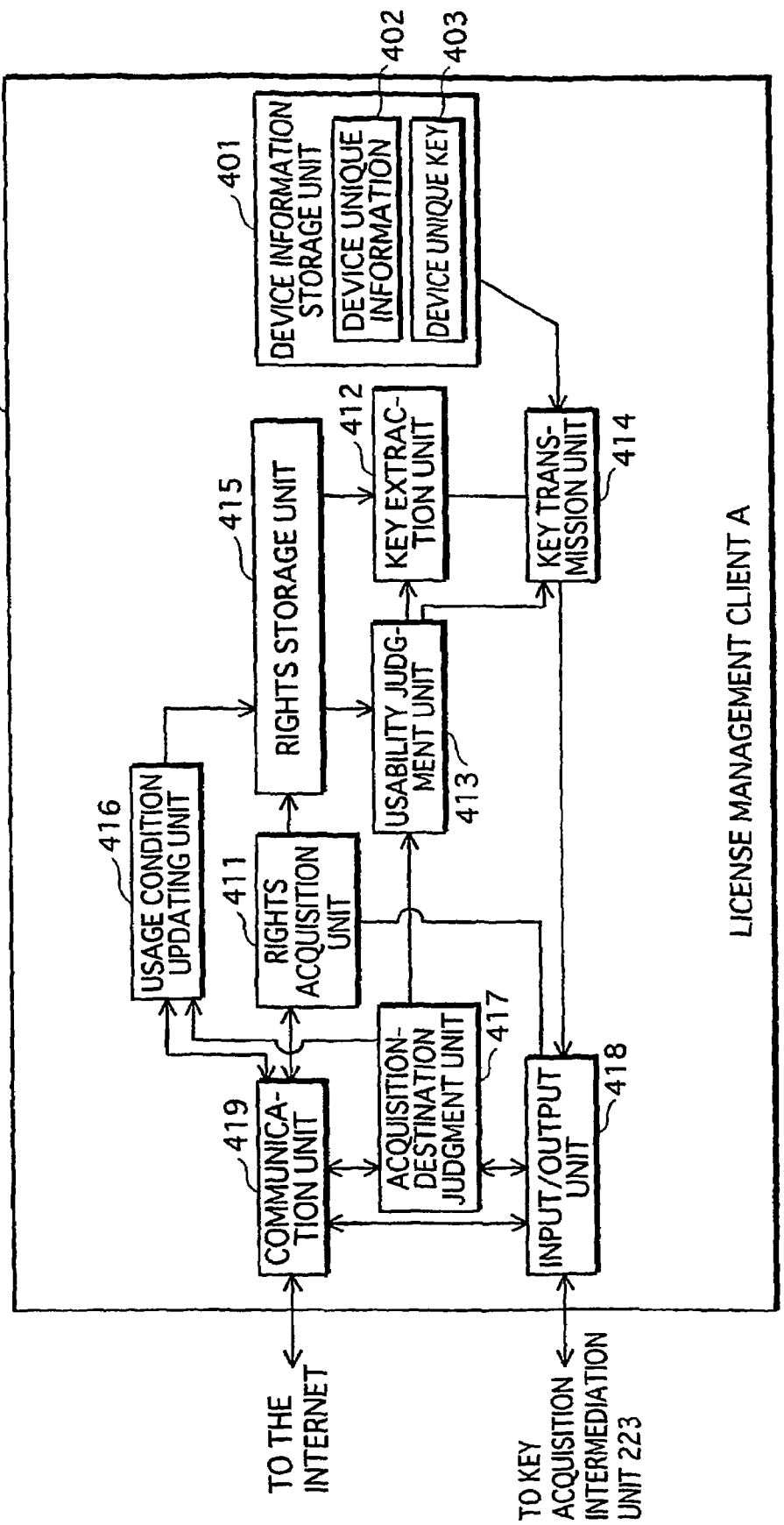
FIG. 11 shows the structure of a license management client A.

The license management client A (107) is an IC card that consists of tamper-resistant hardware, and as shown in FIG. 11, is composed of a device information storage unit 401, a rights acquisition unit 411, a key extraction unit 412, a usability judgment unit 413, a key transmission unit 414, a rights storage unit 415, a usage condition updating unit 416, an acquisition-destination judgment unit 417, and input/output unit 418, and a communication unit 419.

The license management client A (107) is, specifically, a computer system composed of a microprocessor, a ROM, a RAM, a network adapter, and the like. Computer programs are stored in the RAM, and the license management client A (107) achieves its functions by the microprocessor operating according to the computer programs.

Device Information Storage Unit 401, Input Unit 418, Communication Unit 419

The device information storage unit 401, as shown as one example in FIG. 11, pre-stores device unique information 402, and a device unique key 403.

The device unique information 402 is information that is uniquely assigned to the license management client A (107) and is inherent to the license management client A (107). Furthermore, the device unique key 403 is key information that is assigned to the license management client A (107) and is inherent to the license management client A (107).

Here, a ciphertext encrypted using the device unique key 403 can be decrypted using the public key included in the public key certificate "Pub-key-a001" or "Pub-key-a002" stored in the recording medium 102. A ciphertext encrypted using the public key included in the public key certificate "Pub-key-a001" or "Pub-key-a002" can be decrypted using the device unique key 403.

Furthermore, the validity of a signature generated using the device unique key 403 can be verified using the public key included in the public key certificate "Pub-key-a001" or "Pub-key-a002" stored in the recording medium 102. The validity of a signature generated using the public key included in the public key certificate "Pub-key-a001" or "Pub-key-a002" can be verified using the device unique key 403.

The input/output unit 418 connects via a bus to the card reader included in the key acquisition intermediation unit 223 of the playback apparatus 101, and communicates data with the playback apparatus 101.

The communication unit 419 is composed of a network adapter and control software therefore. The communication unit 419 connects to the license server 104 via the Internet 105, and performs transmission/reception of information.

Acquisition-Destination Judgment Unit 417

Processing in Rights Key Acquisition Process

The acquisition-destination judgment unit 417 receives a rights key transmission request from the key acquisition intermediation unit 223 of the playback apparatus 101 via the input/output unit 418, and judges whether or not the acquisition-destination included in the received rights key transmission request is "client A" which shows the license management client A (107).

Included in the rights key transmission request is a package identifier, a content name, an acquisition-destination type, the public key certificate 233, and corresponding rights method information.

When the acquisition-destination type does not show the license management client A (107), the acquisition-destination judgment unit 417 transmits a rights key proxy transmission request to the acquisition-destination module via the communication unit 419, the rights key proxy transmission request including the package identifier, the content name, the corresponding rights method information, and the public key certificate 233. As a response, the acquisition-destination judgment unit 417 receives a signed message from the acquisition-destination module.

When the acquisition-destination type shows the license management client A (107), the acquisition-destination judgment unit 417 transmits the package identifier, the content name, the corresponding rights method information and the public key certificate 233 included in the rights transmission request to the usability judgment unit 413.

Processing in Content Playback Process

The acquisition-destination judgment unit 417 receives signed history information and an acquisition-destination type from the key acquisition intermediation unit 223 of the playback apparatus 101. The signed history information includes a package identifier, a content name, the public key certificate of the playback apparatus 101, a playback history, corresponding rights management information, and a signature.

The acquisition-destination judgment unit 417 judges whether or not the acquisition-destination type shows an apparatus other than the license management client A (107). When the acquisition-destination type shows the license management client A (107), the acquisition-destination judgment unit 417 transmits the signed history information and the acquisition-destination type to the usage condition updating unit 416. When the acquisition-destination type shows another apparatus, the acquisition-destination judgment unit 417 specifies the acquisition-destination module using the acquisition-destination type, and transmits the signed history information to the specified acquisition-destination module.

As a response to the signed history information, the acquisition-destination judgment unit 417 receives a signed update processing result from the usage condition updating unit 416 or the acquisition-destination module, and transmits the received signed update processing result to the key acquisition intermediation unit 223.

Usability Judgment Unit 413

The usability judgment unit 413 receives a package identifier, a content name, corresponding rights method information, and the public key certificate 233 from the acquisition-destination judgment unit 417, reads the playback count and the playback time limit corresponding to the received package identifier and the content name from the rights information table, and, using the read playback count and playback time limit, judges whether or not the content is permitted to be used.

Specifically, when the corresponding rights method information shows "01 (method A)", the usability judgment unit 413 judges that the content is not permitted to be used if the playback count is "0", and judges that the content is permitted to be used if the corresponding rights method information shows "0".

When the corresponding rights method information shows "10 (method B)", the usability judgment unit 413 judges that the content is not permitted to be used if the present date and time exceed the playback time limit, and judges that the content is permitted to be used if the present date and time exceed the playback time limit.

When the corresponding rights method information shows "11 (method A and method B)", and when at least the playback count is "0" or the present data and time exceed the playback time limit, the usability judgment unit 413 judges that the content is not permitted to be used. Otherwise, the usability judgment unit 413 judges that the content is permitted to be used.

When the content has been judged to be not permitted to be used, the usability judgment unit 413 transmits usability information showing that the content is not permitted to be used, to the key transmission unit 414. When the content has been judged to be permitted to be used, the usability judgment unit 413 transmits the read rights information and usage condition type to the key extraction unit 412, and transmits the public key certificate 233 to the key transmission unit 414.

Usage Condition Updating Unit 416

The usage condition updating unit 416 receives the signed history information and the acquisition-destination type from the acquisition-destination judgment unit 417, extracts the public key from the public key certificate 233 included in the signed history information, and, using the public key, verifies whether or not the signature of the signed history information is valid.

When the signature is valid, based on the package identifier, the content name and the corresponding rights method information included in the signed history information, the usage condition updating unit 416 specifies, from among the playback counts and the playback time limits stored in the rights storage unit 415, a playback count and a playback time limit to be updated, updates the specified playback count and playback time limit based on the received playback history, writes the updated playback count and playback time limit to the rights storage unit 415, and sets "update processing ended normally" in the update processing result.

Here, the usage condition updating unit 416 updates the playback times when the corresponding rights method information shows "01 (method A)", updates the playback time limit when the corresponding rights method information shows "10 (method B)", and updates both the playback times and the playback time limit when the corresponding rights method information shows both "11 (method A and method B)".

Specifically, when the read playback count is "5" and the playback history of the received playback history is "2", the usage condition updating unit 416 updates the playback count stored in the rights storage unit 415 to "3".

When the signature is valid, the usage condition updating unit 416 sets "invalid signature" in the update processing result, reads the device unique key 403 from the device information storage unit 401, acquires a signed update processing result by using the device unique key 403 to apply a signature to the update processing result, and transmits the signed update processing result to the acquisition-destination judgment unit 417.

Key Extraction Unit 412

The key extraction unit 412 receives the rights information and the usage condition type from the usability judgment unit 413, extracts the rights key and the playback control condition from the received piece of rights information, and transmits the extracted rights key and playback control condition, and the usage condition type to the key transmission unit 414.

Key Transmission Unit 414

The key transmission unit 414 stores the device unique key 421 that is key information uniquely assigned to the license management client A (107). A ciphertext encrypted using the public key of the license management client A (107) is decrypted using the device unique key 421.

The key transmission unit 414 receives the public key certificate 233 of the playback device 101 from the usability judgment unit 413, and extracts the public key of the playback apparatus 101 from the received public key certificate 233.

The key transmission unit 414 receives the rights key, the playback control conditions and the usage condition type from the key extraction unit 412, and acquires an encrypted rights key by encrypted the rights key with the extracted public key.

The key transmission unit 414 generates a signed message by using the device unique key 403 to applying a signature to the encrypted rights key and the playback control condition, or to the unusabilty information in the case that unusability information has been received from usability judgment unit 413.

Here, a signature made using the device unique key 403 is assumed to be verifiable using the public key of the license management client A (107).

The rights acquisition unit 411 receives the rights acquisition instruction, the package identifier, the contents name, and the corresponding rights method information via the input/output unit 418, and transmits the rights acquisition instruction, the package identifier, the content name, and the corresponding rights method information to the license server 104 via the communication unit 419.

When the rights acquisition unit 411 has received rights information from the rights transmission unit 301 of the license server 104 via the communication unit 419, the rights acquisition unit 411 stores the received rights information in the rights storage unit 415.

Communication Data Between Apparatuses

The following describes communication data between the license server 104 and the license management client A (107).

Figure 13:
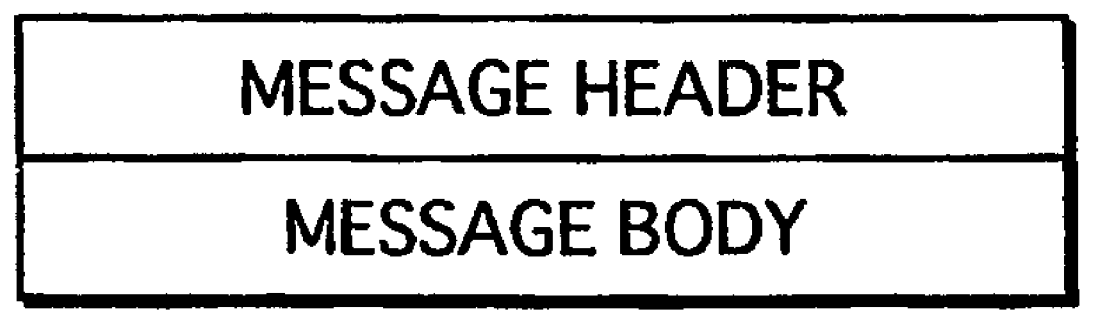

FIG. 13 shows the format of a communication message transmitted/received in communication between the license server 104 and the license management client A (107). The communication message in FIG. 13 is composed of a message header and a message body.

Here, the message header at least includes information specifying the transmission destination and information specifying the transmission origin. The information specifying the transmission destination is referenced as the destination address of the message, and the information specifying the transmission origin is referenced as the destination address when transmitting a message that is a response to the message. One typical example of the information for specifying the transmission origin or transmission destination is an IP address. When authentication processing is to be performed between the server and apparatus that transmit/receive the communication message, information necessary for the authentication processing may be included in the message header. Information unique to the message is included in the message body. A description of the information unique to the message body is given with the description of each message.

Operations of Content Playback System 1

The following describes operations of the content playback system 1.

(1) Start of Content Playback

Figure 14:
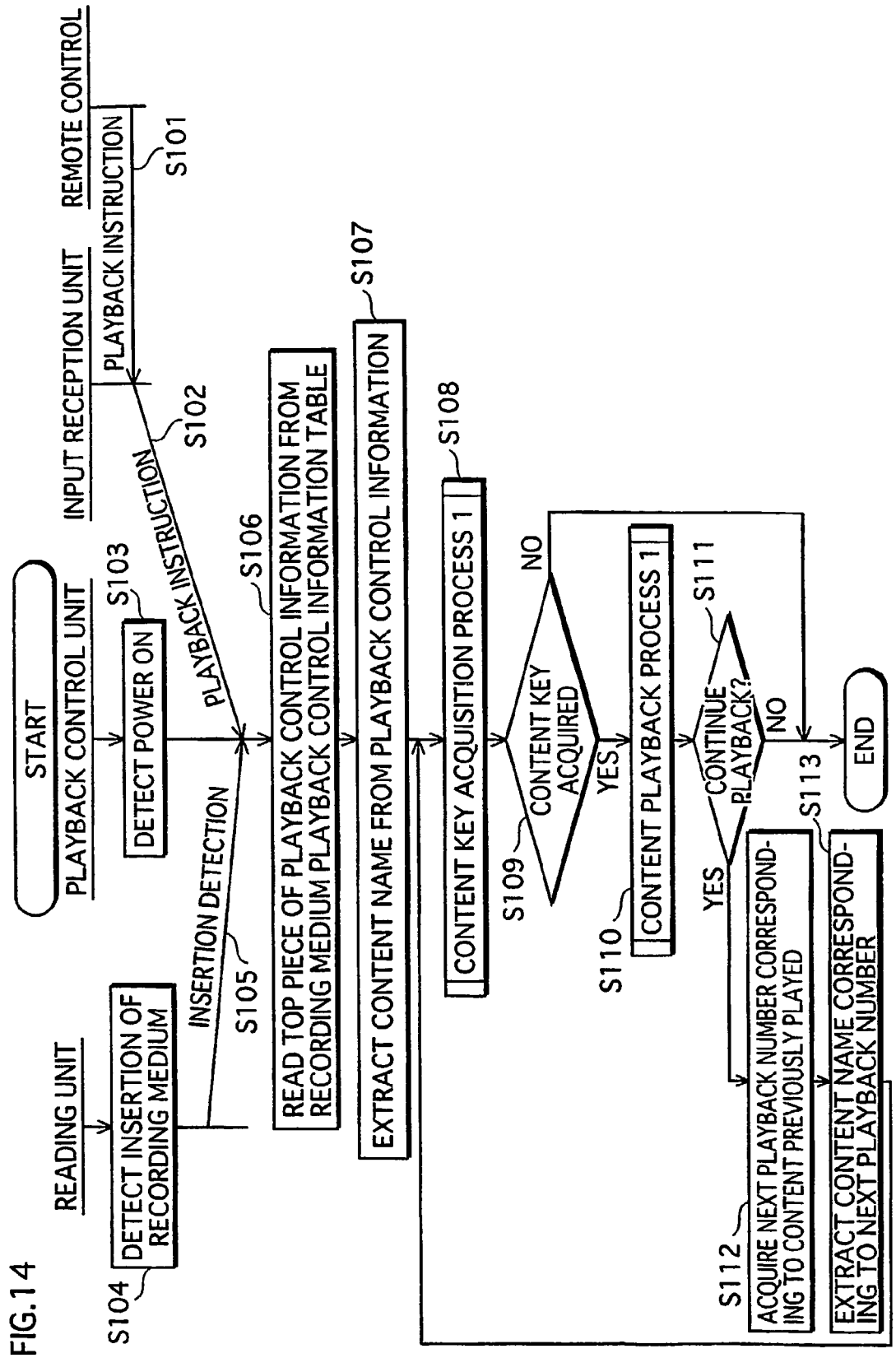
FIG. 14 is a flowchart showing processing when the playback apparatus plays content.

The following describes operations by the playback apparatus 101 at the start of playback of content, with use of the flowchart in FIG. 14.

When the playback control unit 202 has received a playback instruction from the remote control 106 via the input reception unit 221 (steps S101 to S102), and directly after power is supplied from the power unit (step S103), the read unit 201 detects that the recording medium 102 has been mounted (step S104), and the playback control unit 202 receives a signal showing that the recording medium 102 has been inserted (step S105). The playback control unit 202 reads the piece of playback control information that includes the playback number "1" from the playback control information table 211 stored in the recording medium 102 (step S106), extracts the content name from the read playback control information (step S107), and executes the content key acquisition process 1 (step S108).

In the content acquisition processing 1 (step S108), when the content key was able to be acquired, the key acquisition control unit 204 transmits content key storage completion notification which shows that the content key has been acquired, to the playback control unit 202. When the content key was not able to be acquired, the key acquisition control unit 204 transmits content key storage completion notification which shows the content key was not acquired.

When content key storage completion notification showing that the content key was acquired is received, the playback control unit 202 judges that the content key has been acquired, and when content key storage completion notification showing that the content key was not acquired is received, the playback control unit 202 judges that the content key has not been acquired (step S109).

When having judged that the content key was not acquired (step S109: NO), the playback control unit 202 ends the processing. When having judged that the content key was acquired (step S109: YES), the playback control unit 202 executes the content playback process 1 (step S110).

The playback control unit 202 judges whether or not a playback continuation instruction is received from the user (step S111), and when a playback continuation instruction is not received, ends the processing. When a playback continuation instruction has been received, the playback control unit 202 extracts the next playback number from the piece of playback control information corresponding to the content played directly previously (step S112), and further extracts the piece of playback control information corresponding to the extracted next playback number from the playback control information table 211.

The playback control unit 202 extracts the content name included in the piece of playback control information corresponding to the next playback number (step S113), and moves to step S108.

(2) Content Key Acquisition Process 1

Figure 15:
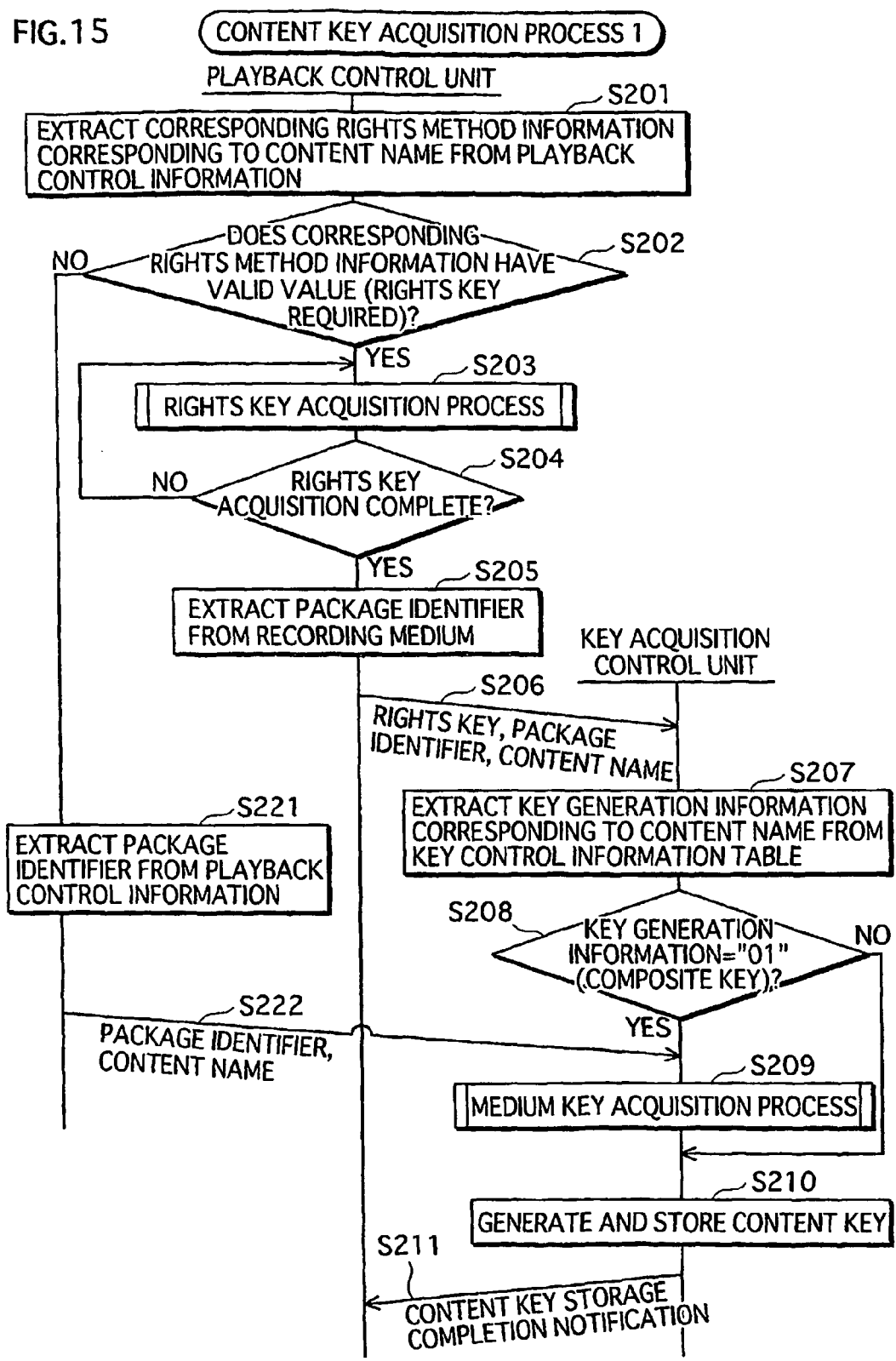
FIG. 15 is a flowchart showing processing in a content key acquisition process 1.
Figure 16:
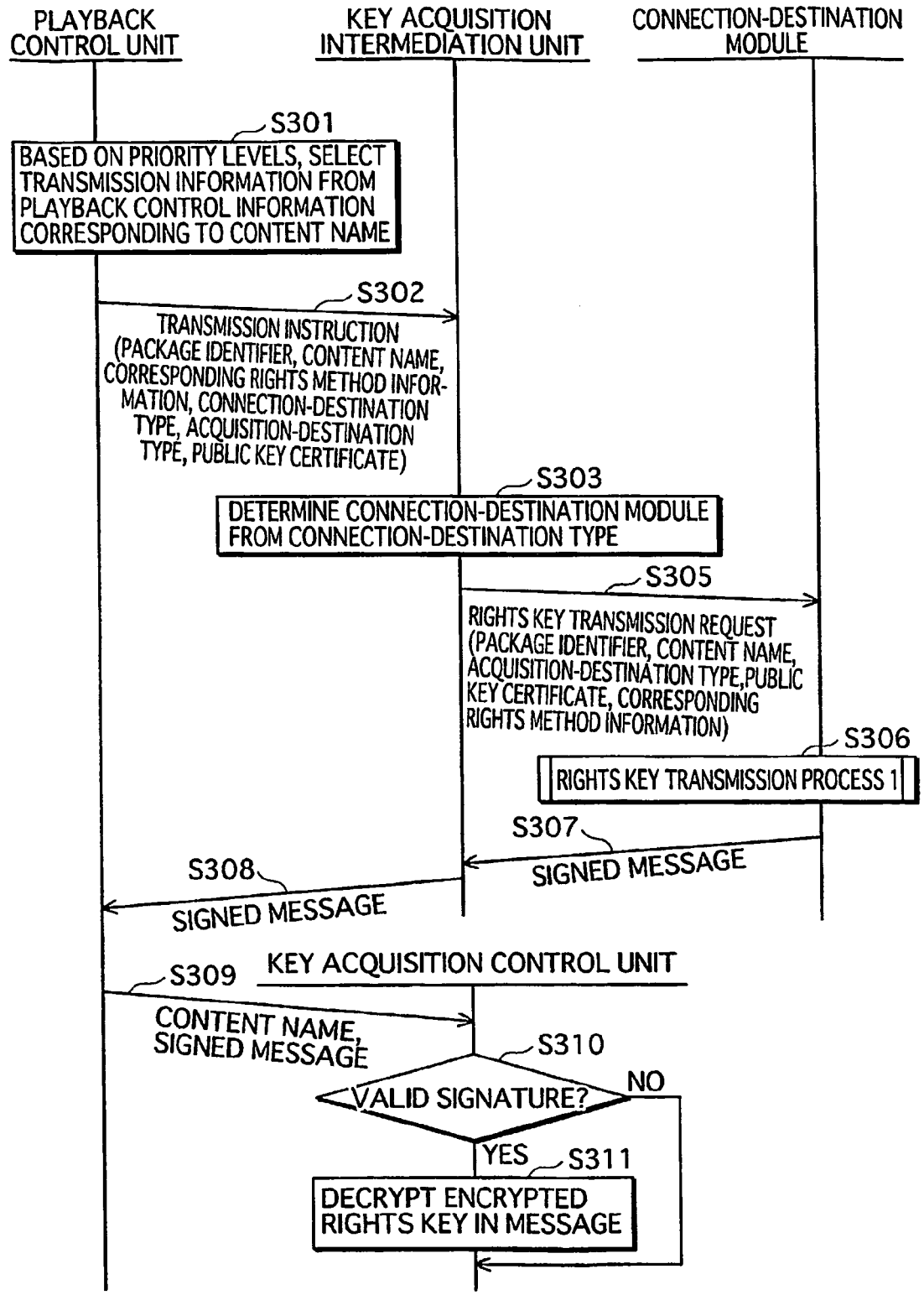
FIG. 16 is a flowchart showing processing in a rights key acquisition process.

Details of the content key acquisition process 1 (step S108) are described with use of FIG. 15.

The playback control unit 202 extracts, from the playback control information table 211 stored in the recording medium 102, the corresponding rights method information corresponding to the content name of the content for which the content key is to be acquired (step S201).

The playback control unit 202 judges whether or not the value of the corresponding rights method information is valid (step S202).

When the value of the corresponding rights method information is valid, in other words when the corresponding rights method information shows that the rights key is necessary (step S202: YES), the playback control unit 202 executes the rights key acquisition process (step S203).

When the rights key was unable to be acquired at step S203 (step S204: NO), the playback control unit 202 re-executes step S203.

When the rights key was able to be acquired at step S203 (step S204: YES), the playback control unit 202 extracts the package identifier 210 corresponding to the content name, from the recording medium 102 (step S205).

The playback control unit 202 transmits the rights key, the package identifier, and the content name to the key acquisition control unit 204 (step S206).

The key acquisition control unit 204 receives the rights key, the package identifier, and the content name from the playback control unit 202, and extracts key generation information corresponding to the received content name, from the key control information table 213 via the reading unit 201 (step S207).

The key acquisition control unit 204 judges whether or not the value of the extracted key generation information is "01" which shows the composite key (step S208).

When it is judged that extracted key generation information is "01", in other words, when the extracted key generation information shows a key generation according to "composite key" (step S208: YES), the key acquisition control unit 204 performs the medium key acquisition process (step S209), generates a content key using the rights key acquired in the rights key acquisition process (step S203) and the medium key acquired in the medium key acquisition processing (step S209), and stores the content key in correspondence with the package identifier and the content name (step S210).

When the composite key is not shown at step S208 (step S208: NO), the key acquisition control unit 204 concatenate the rights key and the content unique information, and applies a one-way function to the resultant concatenated data to generate a content key (step S210).

After the content key has been generated, the key acquisition control unit 204 transmits content keys storage completion notification to the playback control unit 202 (step S211).

When that value of the corresponding rights method information is not valid (step S202: NO), in other words, when the rights key is unnecessary, the playback control unit 202 extracts the package identifier from the piece of playback control information (step S221), transmits the extracted package identifier and the content name to the key acquisition control unit 204 (step S222), and the key acquisition control unit 204 executes the processing from step S209 onwards.

Note that in the content key generation processing at step S210, the content key is generated by concatenating the medium key and the content unique information and applying a one-way function to the resultant concatenated data.

(3) Rights Key Acquisition Process

The following describes details of the rights key acquisition process (step S203).

Based on the priority levels, the playback control unit 202 reads the corresponding rights method information, the connection-destination type and the acquisition-destination type from the piece of playback control information corresponding to the content name, and reads the public key certificate 233 of the playback apparatus 101 from the device information storage unit 207 (step S301).

The playback control unit 202 transmits the package identifier, the content name, the corresponding rights method information, the connection-destination type, the acquisition-destination type, and the public key certificate 233 to the key acquisition intermediation unit 223 (step S302).

The key acquisition intermediation unit 223 receives the package identifier, the content name, the corresponding rights method information, the connection-destination type, the acquisition-destination type, and the public key certificate 233, and specifies the connection-destination module from the received corresponding rights method information and connection-destination type (step S303).

The key acquisition intermediation unit 223 transmits the package identifier, the content name, the acquisition-destination type, and the public key certificate 233 of the playback apparatus 101 to the specified connection-destination module (step S305).

The connection-destination module executes the rights key transmission process 1 (step S306), which is described later.

The connection-destination module transmits the signed message generated in the rights key transmission process 1 (step S306) to the key acquisition intermediation unit 223 (step S307).

The key acquisition intermediation unit 223 receives the signed message, and transmits the received signed message to the playback control unit 202 (step S308).

The playback control unit 202 transmits the content name and the received signed message to the key acquisition control unit 204 (step S309).

The key acquisition control unit 204 receives the content name and the signed message, reads the public key certificate of the acquisition-destination module from the key control information table 213, and extracts the public key from the public key certificate.

The key acquisition control unit 204 verifies the validity of the signature of the received signed message using the extracted public key (step S310).

When the signature is valid (step S310: YES), the key acquisition control unit 204 decrypts the encrypted rights key included in the signed message, with the secret key corresponding to the public key included in the public key certificate of the playback apparatus, to acquire a rights key (step S311). When the signature is invalid (step S310: NO), the key acquisition control unit 204 is unable to acquire the rights key.

(4) Rights Key Transmission Process 1

Figure 17:
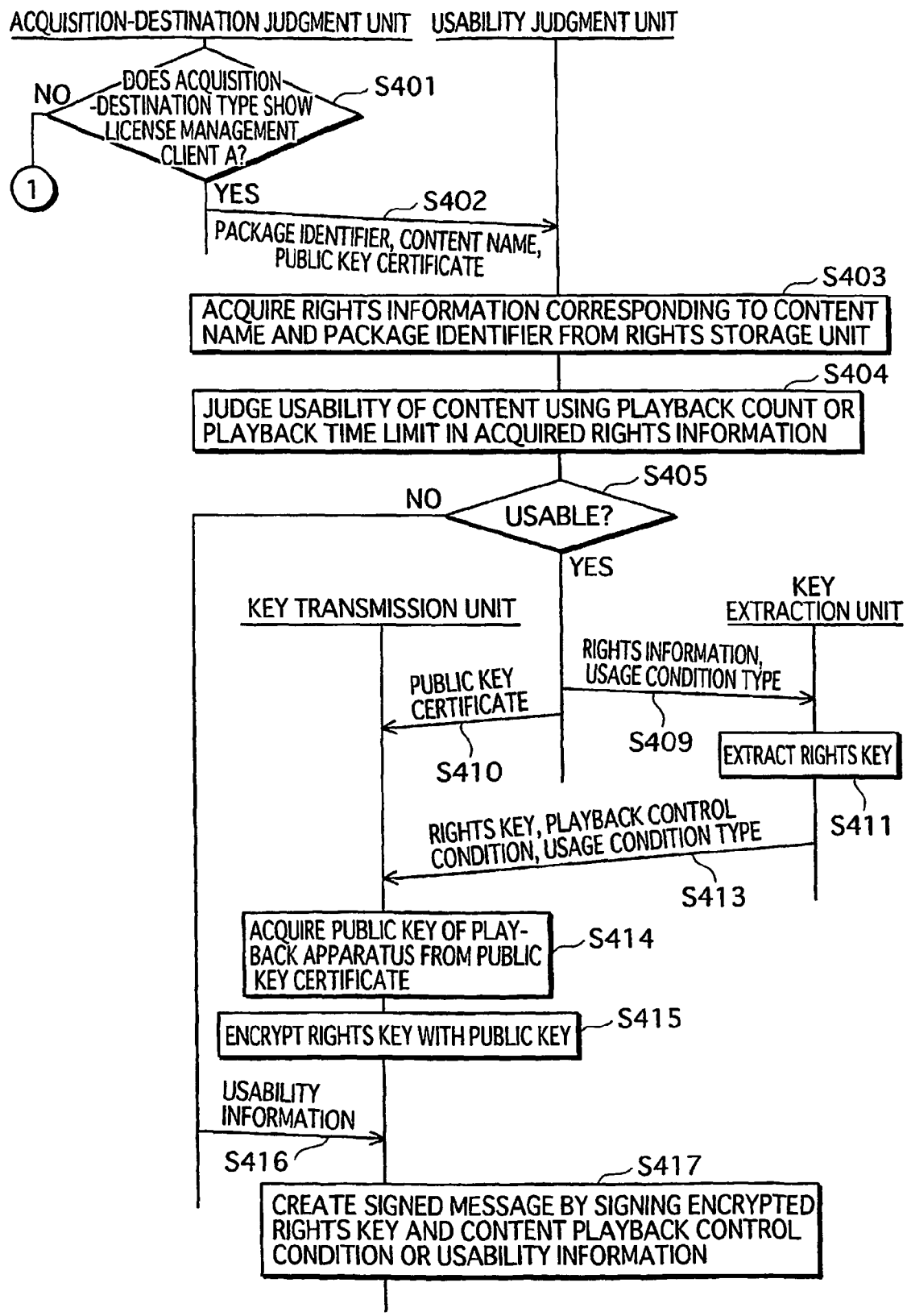
FIG. 17 is a flowchart showing processing in a rights key transmission process 1.
Figure 18:
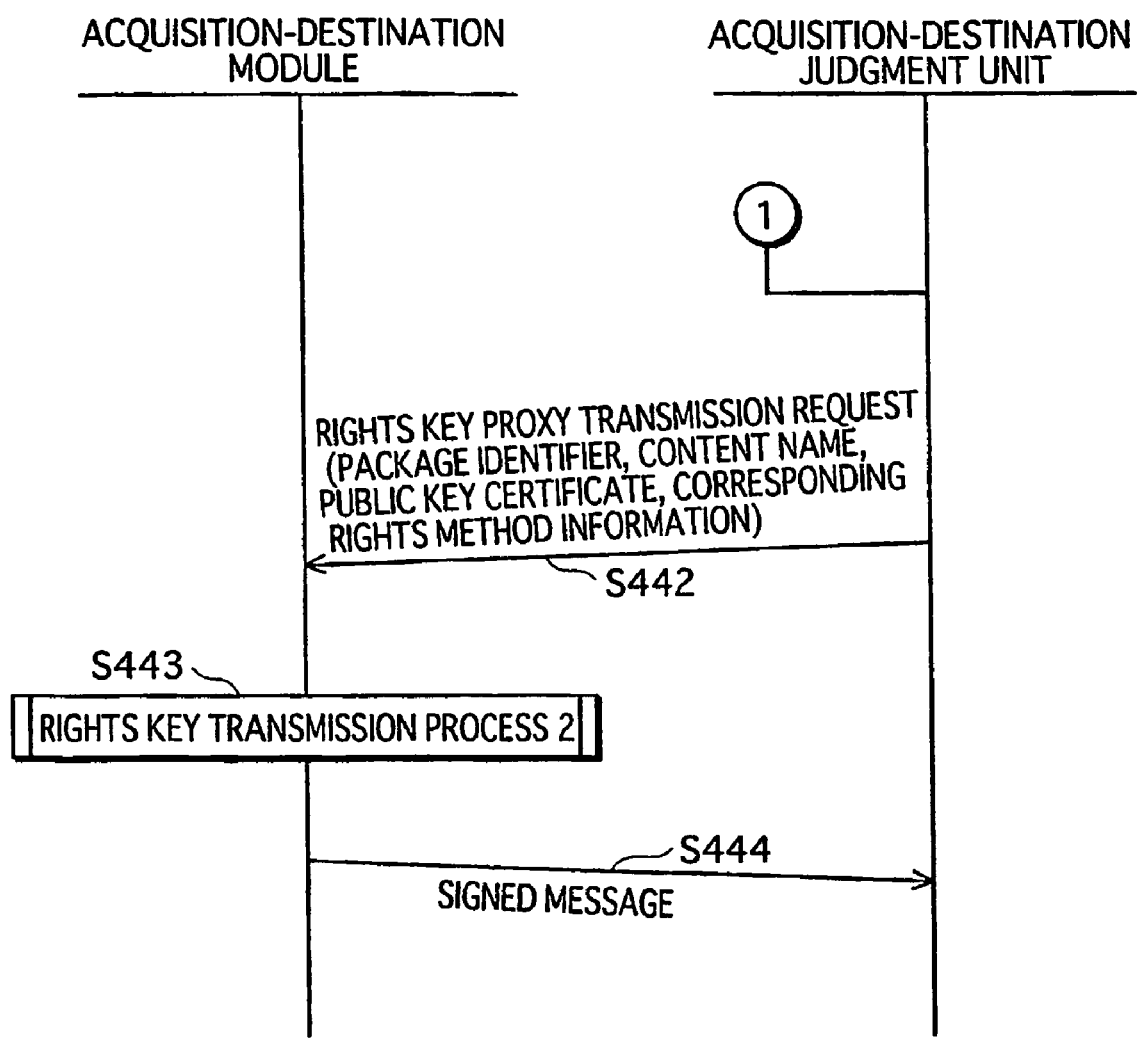
FIG. 18 is a flowchart showing processing in a rights key transmission process 1.

Details of the rights key transmission process 1 (step S306) are described with use of FIG. 17 and FIG. 18, using an example of the connection-destination module being the license management client A (107).

The acquisition-destination judgment unit 417 of the license management client A (107) receives the rights key transmission request from the key acquisition intermediation unit 223 of the playback apparatus 101 via the input/output unit 418. The acquisition-destination judgment unit 417 judges whether the acquisition-destination type included in the received rights key transmission request is "client A" which shows the license management client A (107) (step S401).

When the acquisition-destination type does not show the license management client A (107) (step S401: NO), the acquisition-destination judgment unit 417 transmits a rights key proxy transmission request that includes the package identifier content name, and the public key certificate 233 received from the key acquisition intermediation unit 223, via the communication unit 419 to the acquisition-destination module shown by the acquisition-destination type (step S442).

The acquisition-destination module executes the rights key transmission process 2 described later (step S443), and transmits a signed message to the acquisition-destination judgment unit 417 of the transmission origin of the rights key proxy transmission request (the license management client A (107) that is a connection-destination module) (step S444).

At step S401, when the acquisition-destination type is judged to be "client A", which shows the license management client A (107) (step S401), the acquisition-destination judgment unit 417 transmits the package identifier, the content name, and the public key certificate 233 of the playback apparatus 101 included in the rights key transmission request to the usability judgment unit 413 (step S402).

The usability judgment unit 413 receives the package identifier, the content name, and the public key certificate 233 from the acquisition-destination judgment unit 417, and stores the received package identifier and the rights information corresponding to the content name in the rights information table stored in the rights storage unit 415 (step S403).

The usability judgment unit 413 judges usability of the content with use of the playback count and playback time limit included in the read rights information (step S404).

When the content is judged to not be usable (step S405: NO), the usability judgment unit 413 transmits unusabilty information showing that the content is unusable, to the key transmission unit 414 (step S416).

When the content is judged to be usable (step S405: YES), the usability judgment unit 413 transmits the read rights information and usage condition type to the key extraction unit 412 (step S409), and transmits the public key certificate 233 to the key transmission unit 414 (step S410).

The key extraction unit 412 receives the rights information and the usage condition type from the usability judgment unit 413, and extracts the rights key from the received rights of information (step S411).

The key extraction unit 412 extracts the playback control condition from the rights information, and transmits the extracted rights key, the extracted playback control condition, and the received usage condition type to the key transmission unit 414 (step S413).

The key transmission unit 414 receives the public key certificate 233 of the playback apparatus 101 from the usability judgment unit 413, and extracts the public key of the playback apparatus 101 from the received public key certificate 233 (step S414).

The key transmission unit 414 receives the rights key, the playback control condition, and the usage condition type from the key extraction unit 412, and acquires an encrypted rights key by encrypting the rights key with the extracted public key (step S415).

With use of the device unique key 421, the key transmission unit 414 generates a signed message by signing the encrypted rights key and the playback control condition, or, in the case of having received unusability information from the usability judgment unit 413, signing the unusability information.

(5) Rights Key Transmission Process 2

Figure 19:
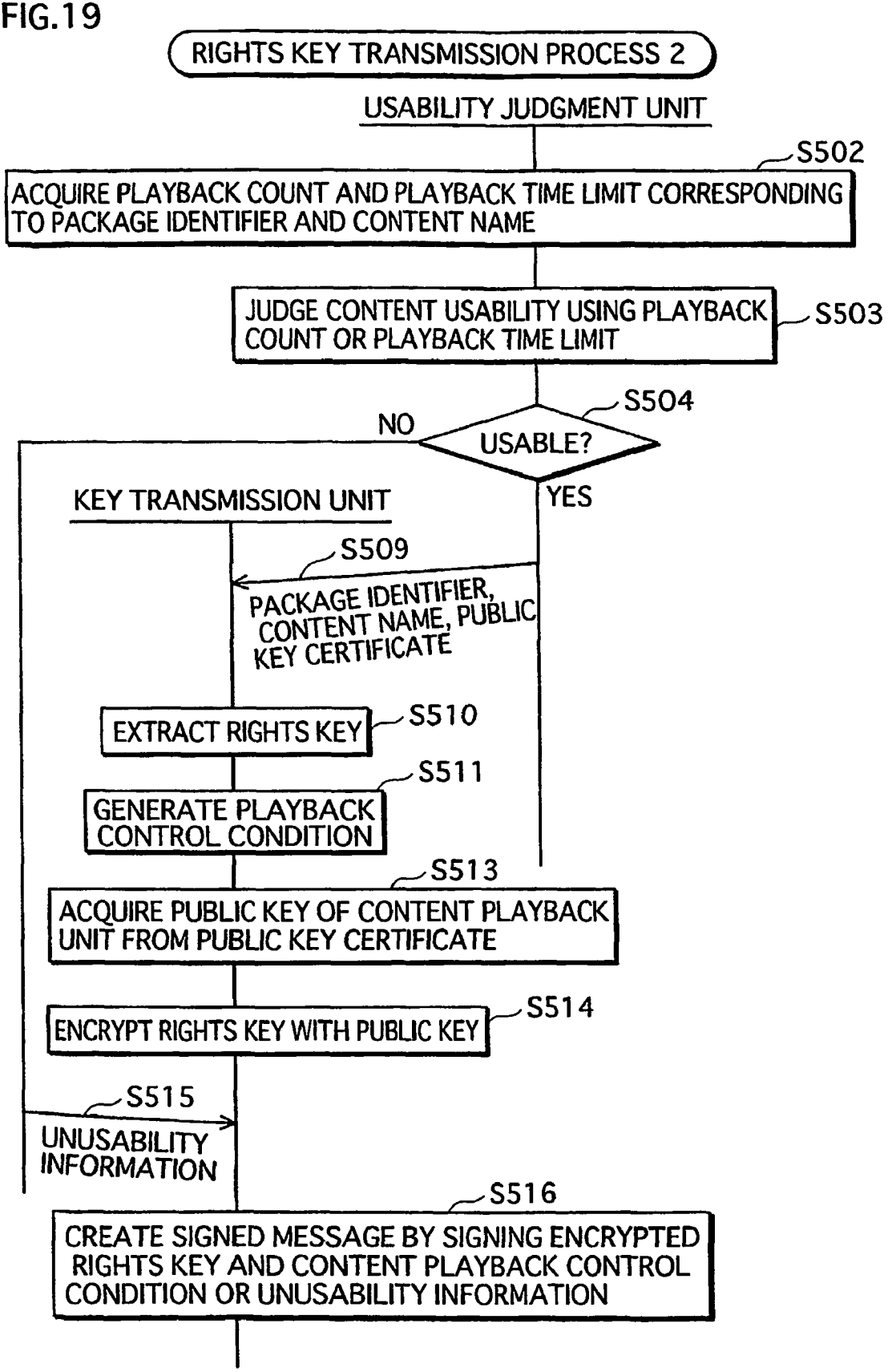
FIG. 19 is a flowchart showing processing in a rights key transmission process 2.

Details of the rights key transmission process 2 (step S443) are described using FIG. 19, with an example of the acquisition-destination module that executes the rights key transmission process 2 being the license server 104.

The usability judgment unit 307 receives the rights key proxy transmission request from the acquisition-destination judgment unit 417 of the license management client A (107) via the communication unit 419, and reads the playback count and the playback time limit corresponding to the package identifier and content name included in the received rights key proxy transmission request, from the usage condition information table stored in the usage condition storage unit 306 (step S502), and, using the playback count and the playback time limit, judges whether or not the content is usable (step S503).

Specifically, the usability judgment unit 307 judges that the content is unusable at least when the playback count is "0" or when the present time and date exceed the playback time limit, and judges that the content is usable in other cases.

When the content is judged to be unusable (step S504: NO), the usability judgment unit 307 transmits unusability information to the key transmission unit 304 (step S515).

When the content is judged to be usable (step S504: YES), the usability judgment unit 307 transmits the package identifier, the content name, and the public key certificate of the playback apparatus 101 to the key transmission unit 304 (step S509).

The key transmission unit 304 receives the package identifier, the content name and the pubic key certificate 233 of the playback apparatus 101 from the usability judgment unit 307, and reads the rights key corresponding to the received package identifier and content name from the key storage unit 305 (step S510).

The key transmission unit 304 reads the playback control condition corresponding to the received package identifier and the content name from the content key information table 121 (step S511).

The key transmission unit 304 extracts the public key of the playback apparatus 101 from the received public key certificate (step S513).

The key transmission unit 304 acquires an encrypted rights key by encrypting the read rights key with the public key (step S514).

The key transmission unit 304 generates a signed message by, with use of the device unique key 322, signing the encrypted key and read playback control condition, or by signing the unusability information in the case of receiving unusabilty information from the usability judgment unit 307 (step S516).

(6) Medium Key Acquisition Process

Figure 20:
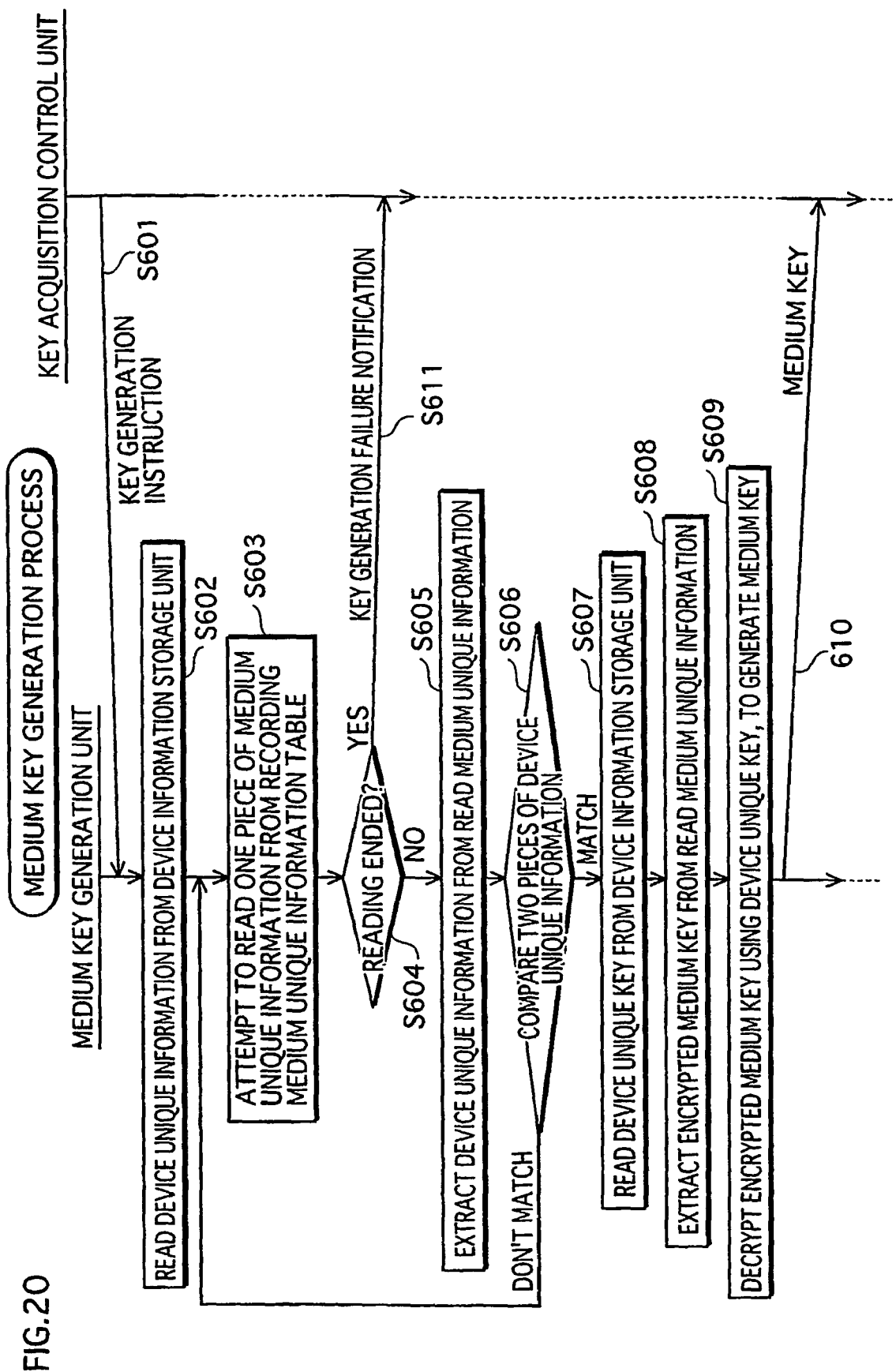
FIG. 20 is a flowchart showing processing in a medium key generation process.
Figure 21:
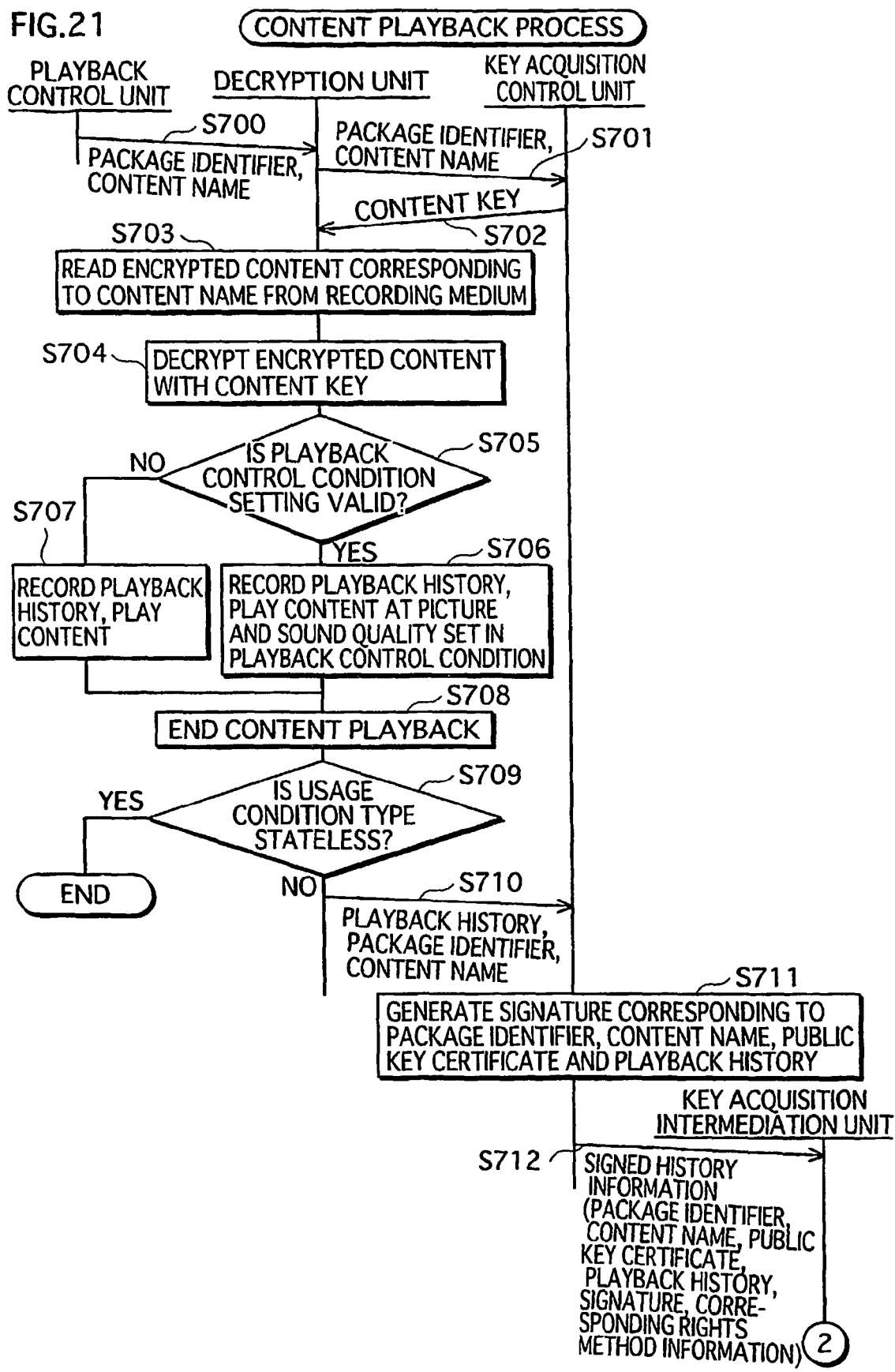
FIG. 21 is a flowchart showing processing in a content playback process.
Figure 22:
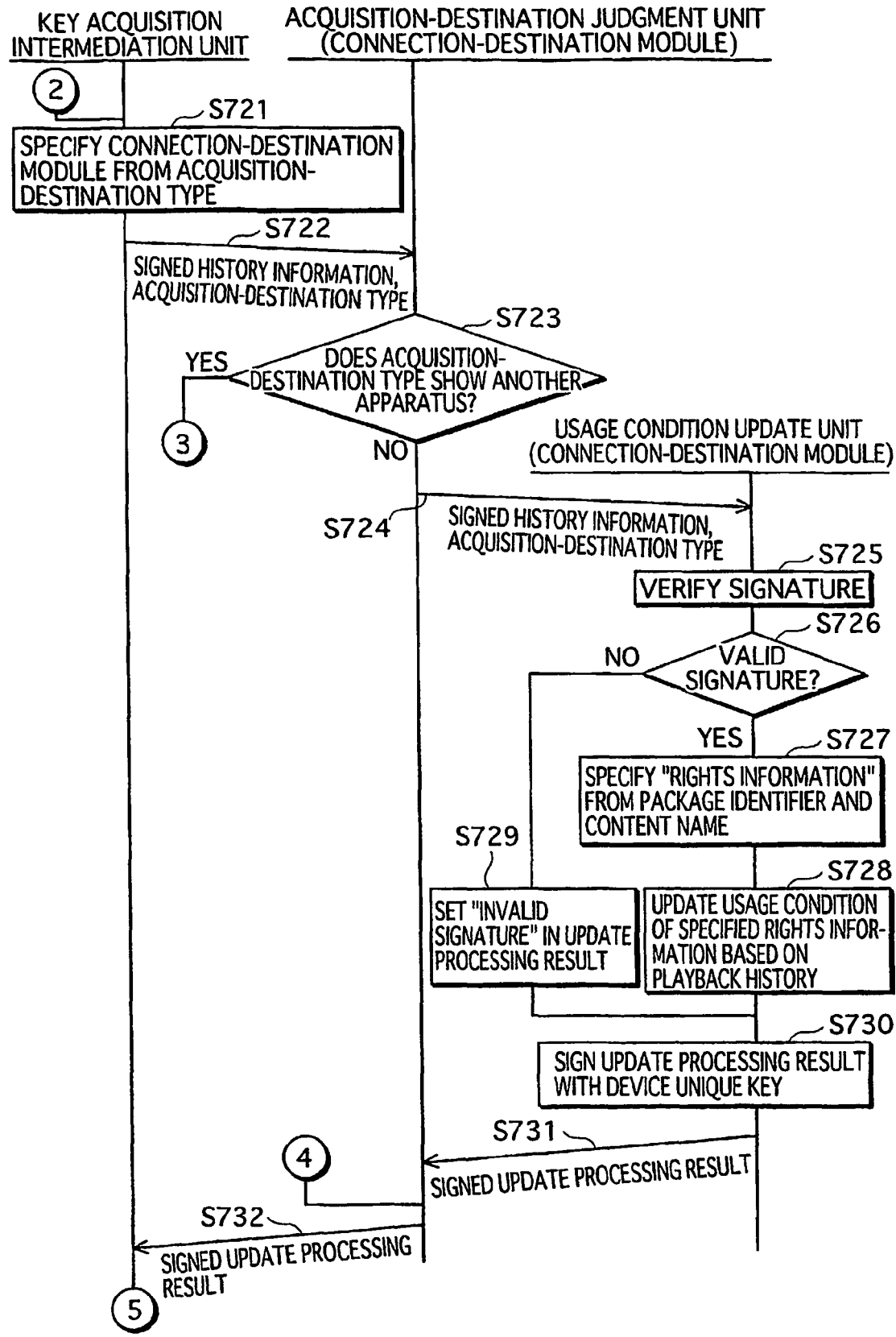
FIG. 22 is a flowchart showing processing in the content playback process.
Figure 23:
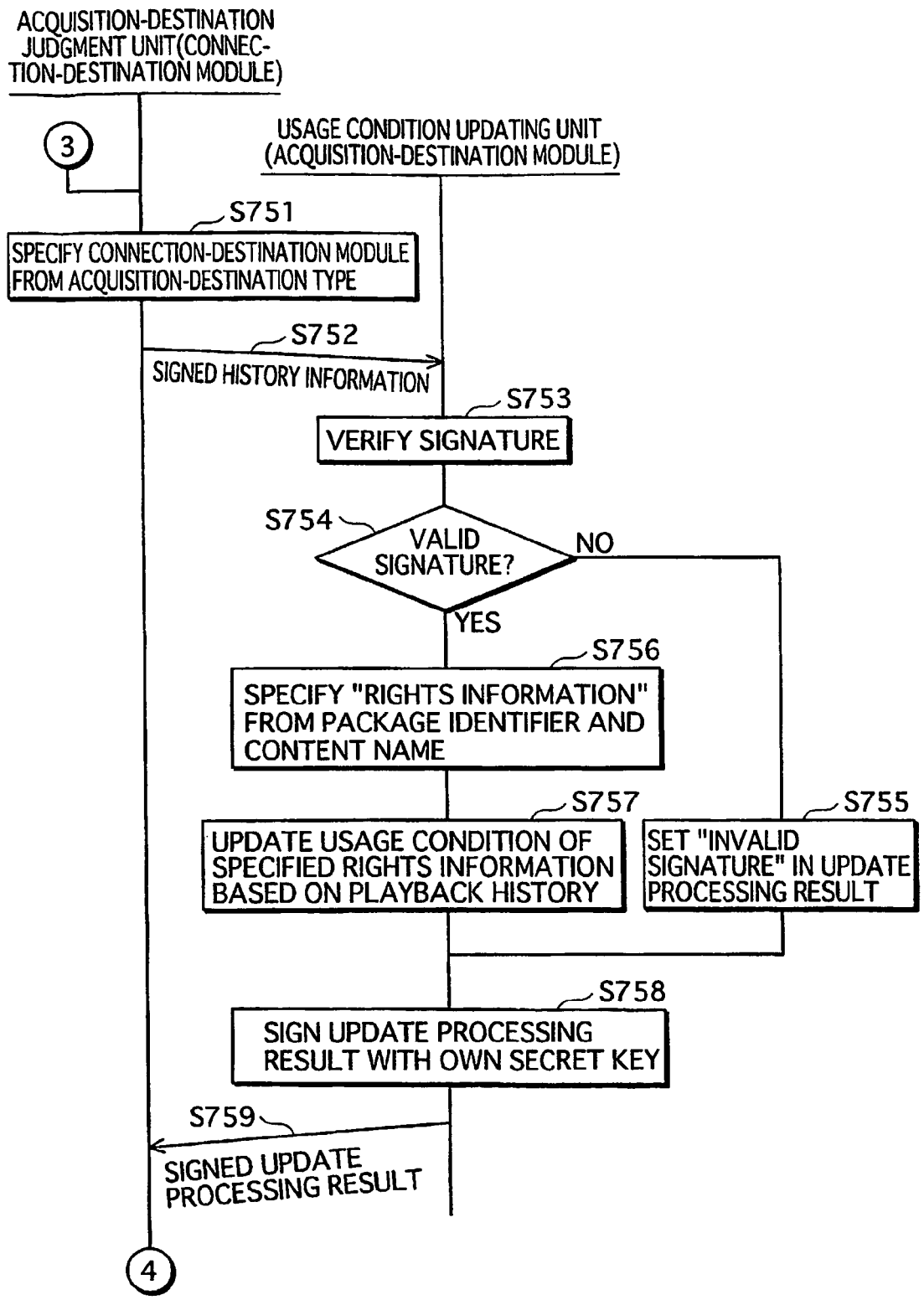
FIG. 23 is a flowchart showing processing in the content playback process.
Figure 24:
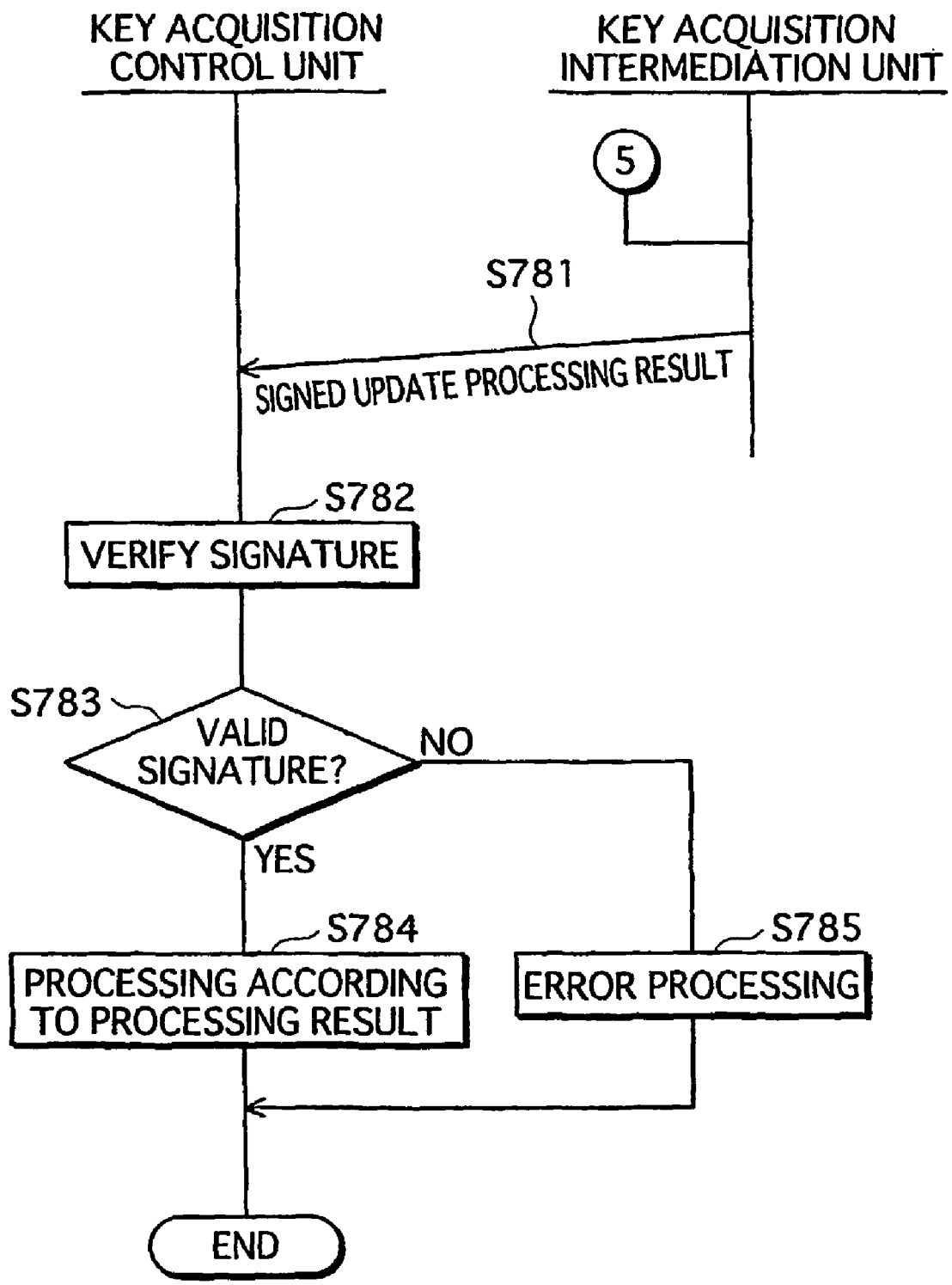
FIG. 24 is a flowchart showing processing in the content playback process.

The following describes details of the medium key acquisition process (step S209) with use of the flowchart shown in FIG. 20.

On receiving, from the key acquisition control unit 204, the key generation instruction showing generation of a key relating to content (step S601), the medium key generation unit 205 reads the device unique information 231 from the device information storage unit 207 (step S602).

Next, the medium key generation unit 205 attempts to read one piece of medium unique information from the medium unique information table 214 of the recording medium 102 (step S603). When reading of all pieces of medium unique information from the medium unique table 214 has ended (step S604), since device unique information identical to the device unique information is not present in the pieces of medium unique information read from the medium unique information table 214, the medium key generation unit 205 outputs key generation failure notification showing that key generation has failed, to the key acquisition control unit 204 (step S611).

When reading of all pieces of medium unique information from the medium unique information table 214 has not ended (step S604: NO), the medium key generation unit 205 extracts device unique information from the read piece of medium unique information (step S605), and compares the extracted device unique information with the device unique information 231 read from the device information storage unit 207 (step S606). When the two pieces of medium unique information are judged to not match (step S606), the medium key generation unit 205 returns to step S603 and repeats the processing.

When the two pieces of medium unique information are judged to match (step S606), the medium key generation unit 205 reads the device unique key 232 from the device information storage unit 207 (step S607), extracts the encrypted medium key from the piece of medium key information read last (step S608), decrypts the extracted encrypted medium key using the read device unique key 232, thereby generating a medium key (step S609), and outputs the generated medium key to the key acquisition control unit 204 (step S610).

(7) Content Playback Process

The content playback process (step S110) is described in detail with use of FIG. 21 to FIG. 24.

The playback control unit 202 transmits the package identifier and the content name corresponding to the content that is to be played, to the decryption unit 203 (step S700).

The decryption unit 203 receives package identifier and the content name from the playback control unit 202, transmits the package identifier and the content name to the key acquisition control unit 204 (step S701), and receives the content key corresponding to the package identifier and the content name, from the key acquisition control unit 204 (step S702).

The decryption unit 203 reads the encrypted content corresponding to the content name from the recording medium 102 via the reading unit 201 (step S703).

The decryption unit 203 decrypts the read encrypted content with the content key received from the key acquisition control unit 204 (step S704).

The decryption unit 203 judges whether or not the playback control condition has a valid setting (step S705).

When the playback control condition has a valid setting, the decryption unit 203 plays the content at the picture and sound quality shown by the playback control condition, while recording playback history (step S706). When the playback control condition is invalid, the decryption unit 203 plays the content without changing the picture or sound quality, while recording playback history (step S707).

The decryption unit 203 detects that playback of the content has ended (step S708), and judges whether or not the usage condition type is stateless (step S709).

When the usage condition type is stateless (step S709: YES), the decryption unit 203 ends the processing. When the usage condition type is statefull (step S709: NO), the decryption unit 203 transmits the package identifier, the content name, and the recorded playback history to the key acquisition control unit 204 (step S710).

The key acquisition control unit 204 receives the package identifier, the content name, and the playback history from the decryption unit 203, reads the public key certificate 233 from the device information storage unit 207, and, using the device unique key 232, generates signed history information by signing the history information that includes the package identifier, the content name and the public key certificate 233 (step S711).

The key acquisition control unit 204 transmits the signed history information to the key acquisition intermediation unit 223 (step S712).

The key acquisition intermediation unit 223 reads the corresponding rights method information that corresponds to the package identifier and the content name in the signed history information, and the connection-destination type from the playback control information table 211, and specifies the connection-destination module from the read corresponding rights method information and connection-destination type (step S721).

The key acquisition intermediation unit 223 reads the acquisition-destination type corresponding to the package identifier and the content name from the playback control information table 211, and transmits the signed history information and the acquisition-destination type to the connection-destination module (step S722).

The acquisition-destination judgment unit 417 in the connection-destination module (license management client A (107)) receives the signed history information and the acquisition-destination type, and judges whether or not the acquisition-destination type shows another apparatus (step S723).

When the acquisition-destination type does not show another apparatus (step S723: NO), the acquisition-destination judgment unit 417 transmits the signed history information and the acquisition-destination type to the usage condition updating unit 416 (step S724).

The usage condition updating unit 416 receives the signed history information and the acquisition-destination type, extracts the key from the public key certificate 233 included in the signed history information, and, using the public key, verifies whether or not the signature of the signed history information is valid (step S725).

When the signature is invalid (step S726: NO), the usage condition updating unit 416 sets "invalid signature" in the update processing result (step S729), and moves to step S730. When the signature is valid (step S726: YES), based on the package identifier and content name included in signed history information, the usage condition updating unit 415 specifies, among rights information stored in the rights information unit 415, rights information that is to be updated (step S727).

The usage condition updating unit 416 updates the specified rights information based on the received playback history, writes the updated rights information to the rights storage unit 415, and sets "update processing ended normally" in the update processing result (step S728).

For instance, when the playback count that is the usage condition in the rights information is "5" and the received playback history is "2", the playback count in the rights information is updated to "3".

The usage condition updating unit 416 reads the device unique key 403 from the device information storage unit 401, acquires a signed update processing result by applying a signature to the update processing result with use of the device unique key 403 (step S730), and transmits the signed update processing result to the acquisition-destination judgment unit 417 (step S731).

On the other hand, at step S723, when it is judged that the acquisition-type destination shows another apparatus (step S723: YES), the acquisition-destination judgment unit 417 uses the acquisition-destination type to specify the acquisition-destination module (step S751).

The acquisition-destination judgment unit 417 transmits the signed history information to the acquisition-destination module (step S752).

The usage condition updating unit 308 of the acquisition-destination module receives the signed history information, extracts the public key from the public key certificate 233 in the signed history information, and uses the public key to verify whether or not the signature of signed history information is valid (step S753).

When the signature is not valid (step S754: NO), the usage condition updating unit 308 sets "invalid signature" in the update processing result (step S755), and proceeds to step S758 which is described later. When the signature is valid (step S756: YES), based on the package identifier and content name included in signed history information, the usage condition updating unit 308 specifies, among rights information stored in the usage condition storage unit 306, rights information that is to be updated (step S756).

The usage condition updating unit 308 updates the specified piece of usage condition information based on the received playback history, writes the updated piece of usage condition information to the usage condition storage unit 306, and sets "update processing ended normally" in the update processing result (step S757).

The usage condition updating unit 308 reads the device unique key 322 from the device information storage unit 320, and uses the device unique key 322 to apply a signature to the update processing result and acquire a signed update processing result (step S758). The usage condition updating unit 308 then transmits the signed update processing result to the connection-destination module (step S759), and the acquisition-destination judgment unit 417 of the connection-destination module receives the signed updated processing result.

The acquisition-destination judgment unit 417 transmits the signed message generated at step S730 or the signed message received from the acquisition-destination module at step S759, via the communication unit 419 to the key acquisition intermediation unit 223 of the playback apparatus 101 (step S732).

The key acquisition intermediation unit 223 of the playback apparatus 101 transmits the received signed message to the key acquisition control unit 204 (step S781).

The key acquisition control unit 204 verifies the signature of the received signed message using the public key of the connection-destination module or the public key of the acquisition-destination module (step S782).

When the signature is valid (step S783: YES), the key acquisition control unit 204 performs predetermined processing according to the update processing result in the signed message (step S784). When the signature is not valid (step S783: NO), the key acquisition control unit 204 performs error processing (step S785).

(8) Processing by License Management Client A (107) for Acquiring Rights Information from License Server 104

The license management client A (107) may take over the rights information from the license server 104 in advance, rather than at the time of playback.

Figure 25:
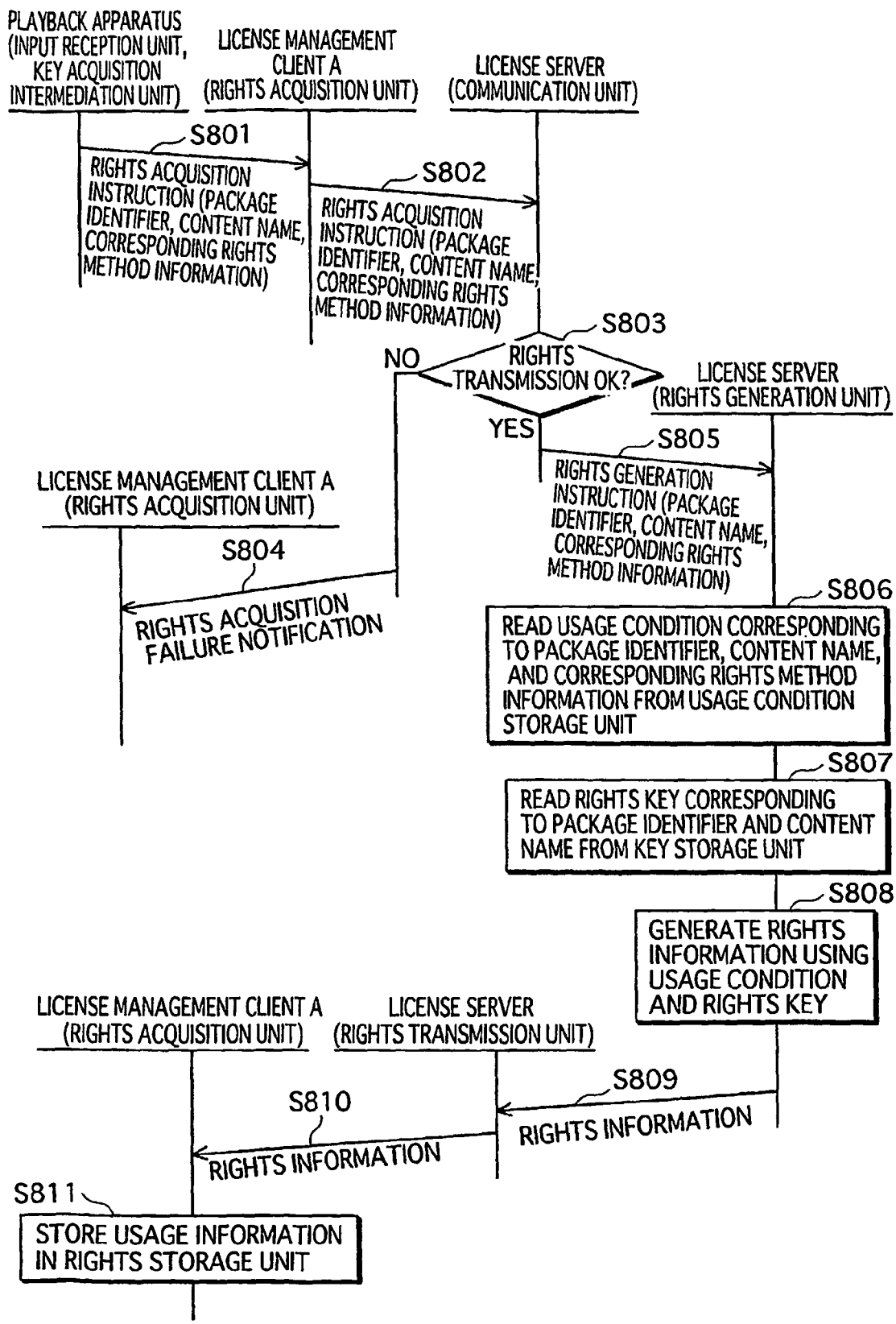
FIG. 25 is a flowchart showing processing when the license management client A acquires rights from the license server.

Processing when the license management client A (107) acquires rights from the license server 104 is described with use of FIG. 25.

With use of the remote control 106, the user of the playback apparatus 101 inputs, with respect to the input reception unit 221, a rights acquisition instruction, and a package identifier, a content name, and corresponding rights method information of encrypted content relating to rights information that is the acquisition target. The input reception unit 221 transmits the rights acquisition instruction, the package identifier, the content name, and the corresponding rights method information via the key acquisition intermediation unit 223 to the license management client A (107) (step S801).

The rights acquisition unit 411 of the license management client A (107) receives the rights acquisition instruction, the package identifier, the content name, and the corresponding rights method information.

The rights acquisition unit 411 transmits the rights acquisition instruction, the package identifier, the content name, and the corresponding rights method information via the communication unit 419 to the license sever 104 (step S802).

The communication unit 300 of the license server 104 receives the rights acquisition instruction, the package identifier, the content name, and the corresponding rights method information from the license management client A (107), and performs user authentication with the communication unit 419 of the license management client A (107).

When user authentication has failed (step S803: NO), the communication unit 300 determines that rights transmission is not permitted, and transmits rights acquisition failure notification to the rights acquisition unit 411 of the license management client A (107) (step S804). When user authentication has succeeded (step S803: YES), the communication unit 300 determines that the rights transmission is permitted, and transmits the rights acquisition instruction, the package identifier, the content name, and the corresponding rights method information (step S805).

The rights generation unit 303 receives the rights acquisition instruction, the package identifier, the content name, and the corresponding rights method information from the communication unit 300, reads, from the usage condition storage unit 306, the usage condition and the playback control condition corresponding to the received package identifier, content name, and corresponding rights method information (step S806), and reads, from the key storage unit 305, the rights key corresponding to the package identifier and the content name (step S807).

The rights generation unit 303 generates rights information from the package identifier, the content name, the rights key, the playback count, the playback time limit, and the playback control condition (step S808), and transmits the rights information to the rights transmission unit 301 (step S809).

The rights transmission unit 301 receives the rights information from the key generation unit 303, and transmits the rights information to the license management client A (107) (step S810).

The rights acquisition unit 411 of the license management client A (107) receives the rights information from the rights transmission unit 301 of the license server 104 via the communication unit 419, and stores the received rights information in the rights storage unit 415 (step S811).

Modification Examples

The present invention has been described based on, but is not limited to, the above embodiment. Cases such as the following are included in the present invention.

(1) An example has been given of the key acquisition intermediation unit 223 of the playback apparatus 101 acquiring a key for decrypting encrypted content recorded in the recording medium 102 from the license management client A (107) or the license server 104. However, the playback apparatus 101 may include a license client B (240) therein, and acquire the key from the license management client B (240).

The license management client B (240) is composed of a secure program execution environment and a program that operates on the program execution environment. The license management client B (240) realizes the same functions as the license management client A (107).

The security level of the license management client B (240) is lower than the security level of the license management client A (107), which is tamper-resistant in terms of hardware.

Figure 26:
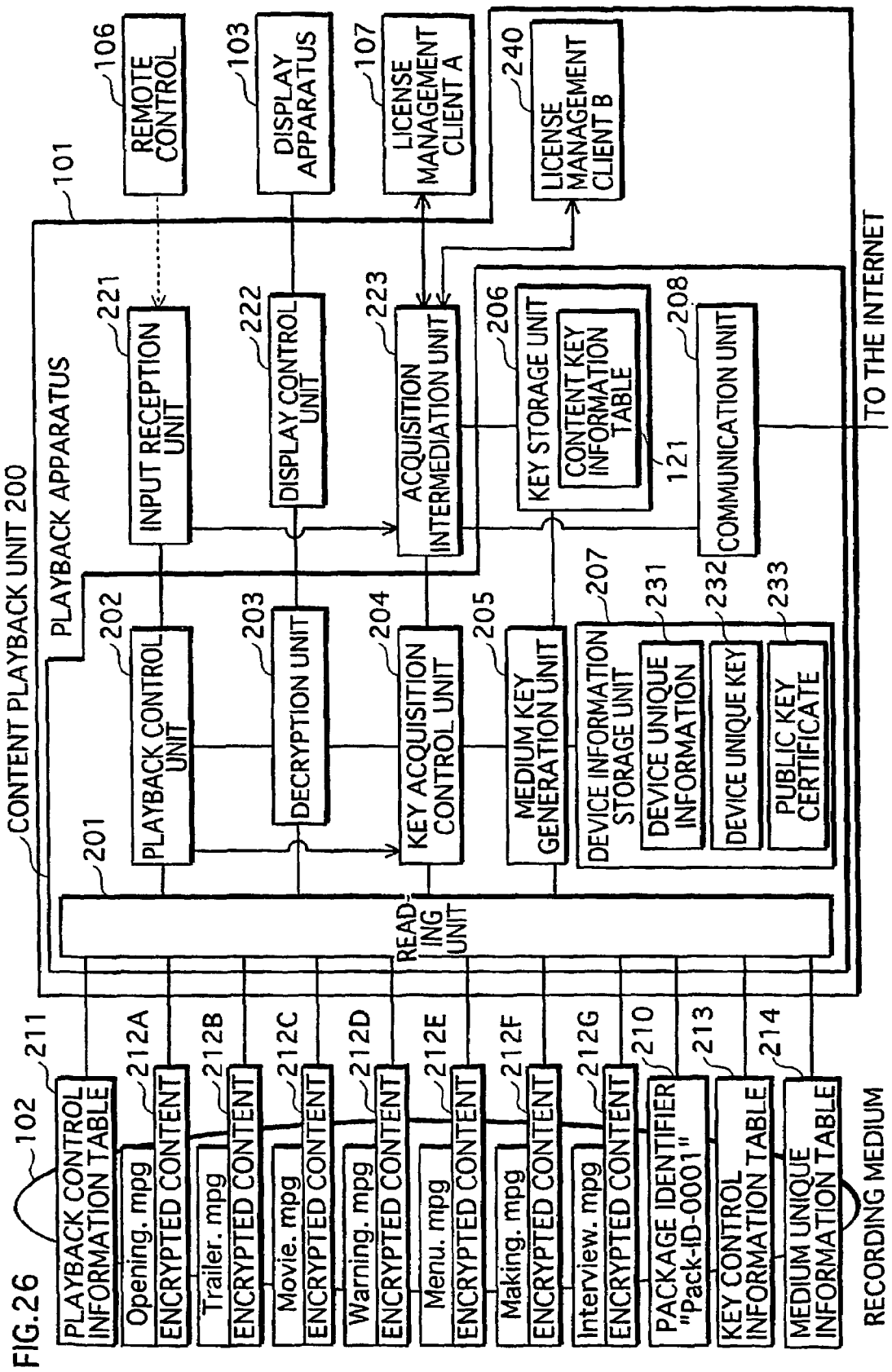
FIG. 26 is a block diagram showing the structure of a playback apparatus that includes a license management client B in a modification example.
Figure 27:
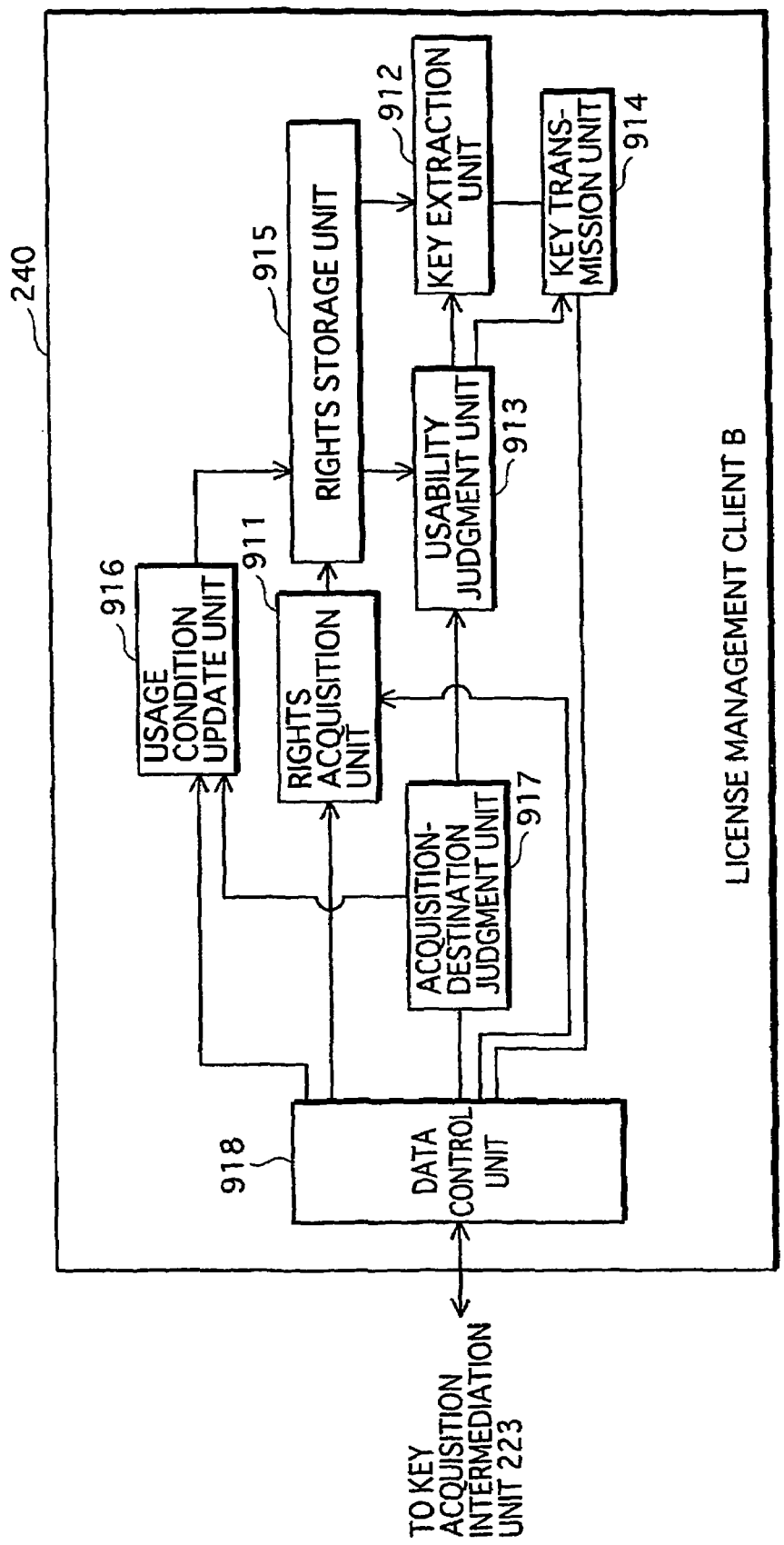
FIG. 27 is a block diagram showing the structure of the license management client B.

The playback apparatus 101 in the present modification example, as shown in FIG. 26, is composed of a content playback unit 200, an input reception unit 221, a display control unit 222, a key acquisition intermediation unit 223, a license management client 240, and a power supply (not illustrated) that supplies power to the compositional units. The content playback unit 200 is a tamper-resistant secure LSI (Large Scale Integration), and is composed of a reading unit 201, a playback control unit 202, a decryption unit 203, a key acquisition control unit 204, a medium key generation unit 205, a key storage unit 206, a device information storage unit 207, and a communication unit 208.

The license management client B (240) is composed of a key acquisition unit 911, a key extraction unit 912, a usability judgment unit 913, a key transmission unit 914, a rights storage unit 915, a usage condition updating unit 916, an acquisition-destination judgment unit 917, and a data control unit 918.

The rights acquisition unit 911 corresponds to the rights acquisition unit 411 in the license management client A (107), the key extraction unit 912 corresponds to the key extraction unit 412, the usability judgment unit 913 corresponds to the usability judgment unit 413, the key transmission unit 914 corresponds to the key transmission unit 414, the rights storage unit 915 corresponds to the rights storage unit 415, and the usage condition update unit 916 corresponds to the usage condition update unit 416.

Note that the rights storage unit 915 may be omitted, and an unused area in the storage area of the key storage unit 206 may be used instead.

Descriptions of operations of the rights acquisition unit 911, the key extraction unit 912, the usability unit 913, the key transmission unit 914, the rights storage unit 915, and the usage condition update unit 916 would duplicate the descriptions of operations of the rights acquisition unit 411, the key extraction unit 412, the usability unit 413 the key transmission unit 414, the rights storage unit 415, and the usage condition update unit 416, and therefore are omitted here.

Furthermore, the data control unit 918 corresponds to the input/output unit 418 and the communication unit 419 in the license management client A (107). The data control unit 918 performs communication with the license management client A (107) via the key acquisition intermediation unit 223, and performs communication with the license server 104 via the key acquisition intermediation unit 223 and the communication unit 208.

(2) An example was given of generating the content key using a medium key and without using a rights key, by concatenating the medium key and content unique information included in the key control information, and applying a one-way function to the resultant concatenated data. Instead, however, the medium key may be used as is as the content key. Alternatively, the content key may be generated by applying a one-way function to the medium key, or generated by decrypting the content unique information with the medium key.

Similarly, an example was given of generating the content key using a rights key and without using a medium key, by concatenating the rights key and the content unique information included in the key control information and applying a one-way function to the resultant concatenated data. Instead, however, the rights key may be used as is as the content key. Alternatively, the content key may be generated by applying a one-way function to the rights key, or generated by decrypting the content unique information with the rights key.

Furthermore, an example was given of generating the content key using both a medium key and a rights key, by concatenating the medium key and the rights key, and applying a one-way function to the resultant concatenated data. Instead, however, the encrypted rights key may be decrypted using the medium key, and the decrypted rights key used as the content key. In addition, when the content key is generated using both the medium key and the rights key, the content unique information may also be used by concatenating the medium key and the rights key, and then further concatenating the content unique information with the resultant concatenated data.

Furthermore, a plurality of the content key generation methods described above may be combined, and information showing which content key generation method is used may be stored in a key generation information table or the like in the recording medium 102. Furthermore, the content key generation method may be determined, for instance, according to the type of content that is the target of playback.

(3) In the embodiment, when the connection-destination module (or the acquisition-destination module) transmits a rights key to the playback apparatus 101, the connection-destination module (or the acquisition-destination module) encrypts the rights key with the public key of the playback apparatus 101 and transmits the rights key in the encrypted form. However, the rights key is not limited to being transmitted in this manner. The rights key may be encrypted with the medium key, or may be dually encrypted with the public key of the playback apparatus 101 and the medium key.

Furthermore, each time a rights key acquisition request is received, the key acquisition intermediation unit 223 may generate and store a random number and transmit the rights key acquisition request with the random number incorporated therein. The connection-destination module may encrypt the rights key, the playback control condition, and other information using the random number, and transmit the encrypted information to the key acquisition intermediation unit 223.

For instance, the key transmission unit 304 encrypts the playback control condition with an encrypted key generated from the random number and the public key of the playback apparatus 101, and signs the encrypted rights key and the encrypted playback control conditions. According to these methods, a different response message can be sent with respect to each rights key acquisition request, hence improving security.

Furthermore, data in which the random number is incorporated in addition to the encrypted rights key, the playback control condition, and the usage condition type may be signed with the device unique key of the connection-destination module or another secret key.

(4) Since the BD media has a file system such as a UDF (universal disk format), a method by which the package identifier 210, the playback control information table 211, the encrypted content 212A to 212G, the key control information table 213, and the medium unique information table 214 are recorded as one or a plurality of files in the file system is common, but the method is not limited to this method. Examples of the method that may be used include recording the medium unique information table 214 in a special area of the lead entry area of the BD media, recording the medium unique information table using a BCA (burst cutting area), and recording information by creating an intentional error in an error detection code.

(5) Each content key information stored in the key storage unit 206 is composed of six items, specifically, a package identifier, a content name, a content key, a playback count, a playback time limit, and a playback control condition. However, the pieces of content key information are not limited to this structure, and may include other items. For instance, the pieces of content key information may include a playback apparatus limitation, a user limitation, a playback geographical region limitation, or the like.

(6) In the processing by the license management client A (107) for acquiring rights information from the license server 104, the rights acquisition processing is triggered by an operation of the remote control 106 by the user of the playback apparatus 101. As an alternative, the rights information may be acquired automatically when purchase of content is complete, or a prediction may be made of the content that is likely to be played next, and the rights information thereof acquired automatically.

(7) The encrypted content 212A to 212G are not limited to being generated by applying an encryption algorithm to the payload of each packet in a transport stream, excluding the application field, of a transport stream obtained by multiplexing an MPEG 2 video stream and an MPEG 2 audio stream according to a multiplexing method stipulated by MPEG 2.

In addition to a video elementary stream and an audio elementary stream, the content may be content for a menu that stores data for button display. The data for button display is commonly recorded as a private stream but is not limited to being so.

(8) The pieces of key control information in the key control information table 213 are not limited to including a public key certificate. For instance, identification information that uniquely specifies a public key certificate may be set in each of the pieces of key control information, and a module that uses a public key may, when using the public key, acquire the public key certificate that corresponds to the information that specifies the public key certificate, or set the public key as an actual item instead of the public key certificate.

Furthermore, instead of setting a public key certificate in the pieces of key control information, the public key certificate of connection-destination module may be acquired from an external apparatus based on the "rights method information" and the "connection-destination type" in the piece of key control information, and the public key certificate of the acquisition-destination may also be acquired from the external apparatus based on the "rights method information" and the "acquisition-destination information".

(9) The method used to confirm the validity of the transmission-origin module when the playback apparatus 101 acquires a rights key from the license management client A (107) or the license server 104 that is the rights key transmission-origin module is not limited to being the described method of using the signature of the transmission-origin module.

For instance, data transmission and reception may be performed after the playback apparatus and the transmission-origin module have established a Secure Authenticated Channel (hereinafter referred to as an "SAC"). The SAC may be established using SSL (Secure Socket Layer) or TLS (Transport Layer Security). When SAC is used, it is unnecessary to confirm the signature in the transmission-origin module and the signature in the playback apparatus 101.

(10) The program of the license management client B (240) that operates in the playback apparatus 101, the playback control program that operates in the content playback control unit 200, the content decryption program, the key acquisition control program, and the medium key generation program may be stored on the recording medium 102.

In such a case, reading of the programs on the recording medium 102 is triggered by a user operation directly after the power of the playback apparatus 101 is turned on, or directly after the recording medium 102 is inserted in the playback apparatus 101.

(11) The key acquisition intermediation unit 223 was described as specifying the connection-destination module from the connection-destination type. Specifically, information in which the connection-destination type is in correspondence with a MAC address or IP address of the connection-destination module may be stored in the playback apparatus 101 or the recording medium 102.

Furthermore, although the key acquisition intermediation unit 223 was described as specifying the connection-destination module from the connection-destination type, the key acquisition intermediation unit 223 may specify the connection-destination module from the corresponding rights method information and the connection-destination type.

Specifically, when the method A and is set in the corresponding rights method information and client A is set in the connection-destination type, connection is established with the license management client A corresponding to method A. The method used by the key acquisition intermediation unit 223 to specify the license management client A corresponding to the method A may be a method in which information that corresponds the connection-destination type, the corresponding rights method information, and the MAC address or IP address of the connection-destination module is stored in the recording medium 102, and the connection-destination module is specified from the stored information.

A further example of numerous other methods is one in which the playback apparatus 101 inquires to all connectable connection-destination modules, and the connection-destination is specified according to the responses.

The present modification can also be applied to when the connection-destination module specifies the acquisition-destination module.

(12) Although the content key acquisition process 1 at step S108 was described as being performed only once when playing the content in order to acquire the content key relating to content that is to be played.

A possible structure is one in which, before playback of the content, for example when the power of the playback apparatus 101 is turned on, the content key acquisition process 1 is performed for all the content names included in the playback control information table 211, the content keys corresponding to each of the content names are pre-acquired, and the content is played using the pre-acquired content key corresponding to the content to the played.

In this case, the display control unit 222 presents a list on the display apparatus 103 of content recorded in the recording medium 102, showing content for which the content key was able to be acquired as playable, and content for which the content key was unable to be acquired as unplayable. The user may be prompted to select content that he/she wishes to have played. The display apparatus 103 may display the content list such that content is differentiated with, for instance, unplayable content being grayed out.

(13) The timing of the rights key and medium key acquisition and the content key generation is not limited to that described in the embodiment. For instance, acquisition of the rights key and the medium key may be performed together at the time of content playback. Alternatively, the rights key only may be acquired in the content key acquisition process 1, and medium generation and content key generation may be executed in the content playback process.

(14) In the embodiment, when the playback apparatus 101 acquires the rights key, the connection-destination is specified based on the corresponding rights method information and the connection-destination type included in the playback control information table 211 of the recording medium 102, but is not limited to being specified in this way.

For instance, the playback apparatus 101 may connect to each connectable module one at a time, and perform signature verification of the response message in each processing, without the recording medium 102 storing the corresponding rights method information and the connection-destination type.

Specifically, the content playback unit 200 may connect one at a time to connectable modules, perform signature verification of respective messages, and when a signature is invalid, continue with the next connectable module. Here, the content playback unit 200 continues content playback processing when the signature is valid.

(15) In the embodiment, when there are at least two connection-destinations at the time of rights key acquisition with respect to one content name, the connection-destination module is determined based priority levels recorded in the pieces of key control information corresponding to the content name. Instead, however, priority levels of the connection-destination modules may be pre-stored in the playback apparatus 101, and the connection-destination module may be determined according to the pre-stored priority levels.

Rules relating to the priority levels may be recorded in the playback apparatus 101, and the connection-destination module may be determined following the rules. Examples of such rules are a rule stating that the license management client A (107) is given priority over the license server 104 in the case of method A, and a rule stating that the license management client A (107) of method B is given priority over the license management client A (107) of method A.

Rules relating to the priority levels stored in the playback apparatus 101 may be stored at the time of manufacture, or may be acquired from another apparatus via the network 105 or from the recording medium 102. Furthermore, when priority levels are set with respect to both the recording medium 102 and the playback apparatus 101, information showing which priority rule has precedence may be recorded in the recording medium 102. Furthermore, information showing which has precedence may be stored in the playback apparatus 101 with the corresponding rights method information, the connection-destination type, the acquisition-destination type, and the priority levels.

(16) In the embodiment, after content playback, the usage condition type is used as a basis to determine whether or not to transmit playback history to the acquisition-destination module (connection-destination module). However, it is possible to always transmit playback history or to never send playback history.

(17) Content keys stored in the key storage unit 206, or rights keys, may be deleted when a predetermined condition is fulfilled. Specifically, a content key or a rights key may be deleted after a set amount of time has passed since being stored in the storage unit 206, or deleted after the recording medium 102 on which the content is stored has been removed from playback apparatus 101.

(18) The license server 104, the license management client A (107), and the license management client B (240) may, on transmitting a rights key, lock the rights condition corresponding to the rights key in an unusable state, and deny any requests from any other apparatuses for the rights key.

(19) In the present embodiment, signature verification using a public key is performed in order to prevent tampering. However, the signature verification may be signature verification based on a MAC (Message Authentication Code) that uses a shared key. Examples of a MAC algorithm include a method that uses a hash function (HMAC) and a method that uses a final value of a chain of a shared key cipher block (CBC-MAC).

(20) Each described apparatus is, specifically, a computer system composed of a microprocessor, a ROM, a RAM, a hard disk unit, a display unit, a keyboard, a mouse, and the like. Computer programs are stored in the RAM or the hard disk unit. Each apparatus achieves predetermined functions by the microprocessor operating according to the computer programs. Each computer program is composed of a plurality of command codes that show instructions with respects to the computer, for achieving the predetermined functions.

(21) All or part of the compositional elements of each apparatus may be composed from one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs.

(22) Part or all of the compositional elements of each apparatus may be composed of a removable IC card or a single module. The IC card or the module is a computer system composed of a microprocessor, a ROM, a RAM, or the like. The IC card or the module may included the aforementioned super-multifunctional LSI. The IC card or the module may achieve its functions by the microprocessor operating according to computer programs. The IC card or the module may be tamper-resistant.

(23) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM (compact disk-read only memory), and MO (magneto-optical), a DVD (digital versatile disk), a DVD-ROM (digital versatile disk-read only memory), a DVD-RAM (digital versatile disk-random access memory), a BD (Blu-ray Disc) or a semiconductor memory, that stores the computer program or the digital signal. Furthermore, the present invention may be the computer program or the digital signal recorded in any of the aforementioned recording medium apparatuses.

Furthermore, the present invention may be the computer program or the digital signal transmitted on a electric communication network, a wireless or wired communication network, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(24) The present invention may be any combination of the above-described embodiment and modifications.

INDUSTRIAL APPLICABILITY

The apparatuses and recording medium that compose the present invention can be manufactured and sold in an industry relating to electrical devices such as digital household appliances that play content, and used in a content distribution industry that creates and distributes content.

The invention claimed is:

1. A content playback apparatus that decrypts encrypted content recorded on a recording medium, thereby obtaining content, and plays the content,
the recording medium having recorded thereon a plurality of pieces of encrypted content respectively in correspondence with a plurality of pieces of management source information, each piece of management source information showing, from among a plurality of management source apparatuses, a management source apparatus that manages usage of the corresponding piece of encrypted content based on corresponding playback control management performed by the management source apparatus,
the content playback apparatus comprising:
a processor;
a designation acquisition unit operable to acquire a designation of one of the pieces of encrypted content;
a management source acquisition unit operable to acquire, from among the pieces of management source information recorded on the recording medium, a piece of management source information that corresponds to the designated piece of encrypted content;
a key information acquisition unit operable to acquire, from the management source apparatus shown by the acquired piece of management source information, a piece of key information that shows usage permission for the designated piece of encrypted content;
a decryption unit operable to generate, using the processor, a content key based on the acquired piece of key information, and generate a piece of content by decrypting the designated piece of encrypted content with use of the generated content key; and
a playback unit operable to play the generated piece of content,
wherein at least one of the pieces of management source information includes a plurality of pieces of candidate information, each piece of candidate information showing a different one of a plurality of candidate apparatuses that are candidates for the management source apparatus pertaining to the piece of encrypted content corresponding to the piece of management source information, and
wherein the key information acquisition unit includes:
a candidate information judgment sub-unit operable to judge whether the acquired piece of management source information includes pieces of candidate information;
an acquisition-destination determination sub-unit operable to, when the judgment is affirmative, select one of the pieces of candidate information included in the acquired piece of management source information; and
a key information acquisition sub-unit operable to, when the judgment is affirmative, acquire, from the management source apparatus, which is the candidate apparatus shown in the selected piece of candidate information, the piece of key information showing usage permission for the designated piece of encrypted content, and when the judgment is negative, acquire the piece of key information from the management source apparatus shown by the piece of management source information.

2. The content playback apparatus of claim 1, wherein
at least one of the management source apparatuses includes a key relay apparatus that relays key information and a key management apparatus that manages key information,
among the pieces of management source information, at least one of the pieces of management source information that shows the at least one management source apparatus that includes the key relay apparatus and the key management apparatus, includes a piece of key relay apparatus information that shows the key relay apparatus and a piece of key management apparatus information that shows the key management apparatus,
the key information acquisition unit includes:
a request transmission sub-unit operable to judge whether the acquired piece of management source information includes a piece of key relay information and a piece of key management apparatus information, and when the judgment is affirmative, transmit, to the key relay apparatus shown by the piece of key relay apparatus information included in the piece of management source information, (i) a piece of content designation information that shows the designated piece of encrypted content and (ii) the piece of key management apparatus information included in the piece of management source information; and
a response acquisition sub-unit operable to acquire the piece of key information, which corresponds to the designated piece of encrypted content, from the key relay apparatus,
the key relay apparatus receives the piece of content designation information and the piece of key management apparatus information, transmits the piece of content designation information to the key management apparatus shown by the piece of key management apparatus information, receives from the key management apparatus the piece of key information corresponding to the piece of content designation information, and transmits the received piece of key information to the content playback apparatus, and
the key management apparatus receives the piece of content designation information, and transmits the piece of key information corresponding to the piece of content specification information to the key relay apparatus.

3. The content playback apparatus of claim 1, wherein
each piece of candidate information includes a priority level showing with how much priority the piece of candidate information is to be given with respect to other pieces of candidate information in selection, and
the acquisition-destination determination sub-unit, when the judgment is affirmative, selects a piece of candidate information having a highest priority level among the pieces of candidate information, and selects the piece of candidate information having the highest priority level as the one piece of candidate information.

4. The content playback apparatus of claim 1, wherein
the acquisition-destination sub-unit (a) stores (i) a plurality of pieces of selection information, each of which shows a different one of a plurality of candidate apparatuses, in correspondence with (ii) a plurality of priority levels, each priority level showing with how much priority the corresponding piece of selection information is to be given with respect to other pieces of selection information in selection, (b) when the judgment is affirmative, reads, with respect to each of the pieces of candidate information in the acquired piece of management source information, the priority level corresponding to the piece of selection information showing a same candidate apparatus as the piece of candidate information, (c) selects a highest priority level from among the read priority levels, and (d) selects the piece of candidate information that shows a same candidate apparatus as the piece of selection information corresponding to the selected priority level.

5. The content playback apparatus of claim 1, wherein
the content playback apparatus is connected over a network to each of the candidate apparatuses, and
the acquisition-destination determination unit reads one of the pieces of candidate information at a time, attempts to establish communication with the candidate apparatus shown by the read piece of candidate information, and when communication is able to be established, selects the read piece of candidate information as the one piece of candidate information.

6. The content playback apparatus of claim 1, wherein
one of the management source apparatuses is a secure IC card and is connected to the content playback apparatus,
among the pieces of management source information, a piece of management source information that corresponds to the IC card shows the IC card as the management source apparatus, and
the key information acquisition unit judges whether the acquired piece of management source information shows the IC card, and when the judgment is affirmative, acquires the piece of key information from the IC card.

7. The content playback apparatus of claim 1, wherein
one of the management source apparatuses is a server apparatus and is connected to the content playback apparatus over a network,
among the pieces of management source information, a piece of management source information corresponding to the server apparatus shows the server apparatus as the management source apparatus, and
the key information acquisition unit judges whether the acquired piece of management source information shows the server apparatus, and when the judgment is affirmative, acquires the piece of key information from the server apparatus over the network.

8. The content playback apparatus of claim 7, wherein
the network is an internet,
the piece of management source information corresponding to the server apparatus is an IP address that is an address of the server apparatus on the internet, and
the key information acquisition unit judges whether the acquired piece of management information is an IP address, and when the acquired piece of management information is judged to be an IP address, acquires the piece of key information over the network from the server apparatus whose address in the IP address.

9. The content playback apparatus of claim 1, wherein
the content playback apparatus includes a CPU and a memory, the memory storing a content playback program and a key information management program, the content playback apparatus operating as a content playback apparatus by the CPU operating according to the content playback apparatus program, and the content playback apparatus operating as a key management module by the CPU operating according to the key information management program,
the memory includes a management area and a free area, the management area being readable only by the key management module, and the free area being writable by the key management module and readable by the content playback apparatus,
the piece of key information is stored in advance in the management area,
one of the management source apparatuses is the key management module,
among the pieces of management source information, a piece of management source information corresponding to the key management module identifies the key management module,
the key management module reads the piece of key information from the management area, and writes the read piece of key information to the free area, and
the key information acquisition unit judges whether the acquired piece of management source information shows the key management module, and when the judgment is affirmative, acquires the piece of key information by reading the piece of key information that has been written to the free area by the key management module.

10. The content playback apparatus of claim 1, wherein
one of the management source apparatuses is a secure IC card and is connected to the content playback apparatus via a bus,
another one of the management source apparatuses is a server apparatus and is connected to the content apparatus over a network,
the content playback apparatus includes a CPU and a memory, the memory storing a content playback program and a key information management program, the content playback apparatus operating as a content playback apparatus by the CPU operating according to the content playback apparatus program, and the content playback apparatus operating as a key management module by the CPU operating according to the key information management program,
the memory includes a management area and a free area, the management area being readable only by the key management module, and the free area being writable by the key management module and readable by the content playback apparatus,
the piece of key information is stored in advance in the management area,
yet another one of the management source apparatuses is the key management module, among the pieces of management source information, a piece of management source information corresponding to the IC card shows the IC card as the management source apparatus, among the pieces of management source information, a piece of management source information corresponding to the server apparatus shows the server apparatus as the management source apparatus, among the pieces of management source information, a piece of management source information corresponding to the key management module shows the key management module as the management source apparatus, and the key information acquisition unit includes:
  a judgment sub-unit operable to judge which of the IC card, the server apparatus, and the key management module is shown by the acquired piece of management source information;
  an acquisition sub-unit operable to (a) when the IC card is judged to be shown by the acquired piece of management source information, acquire the piece of key information from the IC card, (b) when the server apparatus is judged to be shown by the acquired piece of management source information, acquire the piece of key information from the server apparatus over the network, and (c) when the key management module is judged to be shown by the acquired piece of management source information, acquire the piece of key information from the key management module by reading the piece of key information that has been written to the free area from the free area.

11. A content playback method used in a content playback apparatus that decrypts encrypted content recorded on a recording medium, thereby obtaining content, and plays the content, the recording medium having recorded thereon a plurality of pieces of encrypted content respectively in correspondence with a plurality of pieces of management source information, each piece of management source information showing, from among a plurality of management source apparatuses, a management source apparatus that manages usage of the corresponding piece of encrypted content based on corresponding playback control management performed by the management source apparatus, the content playback method comprising the steps of:
a designation acquisition step of acquiring a designation of one of the pieces of encrypted content;
a management source acquisition step of acquiring, from among the pieces of management source information recorded on the recording medium, a piece of management source information that corresponds to the designated piece of encrypted content;
a key information acquisition step of acquiring, from the management source apparatus shown by the acquired piece of management source information, a piece of key information that shows usage permission for the designated piece of encrypted content;
a decryption step of generating, using a processor, a content key based on the acquired piece of key information, and generating a piece of content by decrypting the designated piece of encrypted content with use of the generated content key; and
a playback step of playing the generated piece of content,
wherein at least one of the pieces of management source information includes a plurality of pieces of candidate information, each piece of candidate information showing a different one of a plurality of candidate apparatuses that are candidates for the management source apparatus pertaining to the piece of encrypted content corresponding to the piece of management source information, and wherein the key information acquisition step includes:
  a candidate information judgment step of judging whether the acquired piece of management source information includes pieces of candidate information;
  an acquisition-destination determination step of, when the judgment is affirmative, selecting one of the pieces of candidate information included in the acquired piece of management source information; and
  a key information acquisition step of, when the judgment is affirmative, acquiring, from the management source apparatus, which is the candidate apparatus shown in the selected piece of candidate information, the piece of key information showing usage permission for the designated piece of encrypted content, and when the judgment is negative, acquiring the piece of key information from the management source apparatus shown by the piece of management source information.

12. A non-transitory computer-readable recording medium on which is recorded a computer program used in a content playback apparatus that decrypts encrypted content recorded on a content recording medium, thereby obtaining content, and plays the content, the content recording medium having recorded thereon a plurality of pieces of encrypted content respectively in correspondence with a plurality of pieces of management source information, each piece of management source information showing, from among a plurality of management source apparatuses, a management source apparatus that manages usage of the corresponding piece of encrypted content based on corresponding playback control management performed by the management source apparatus, the computer program causing the content playback apparatus to perform a method comprising the steps of:
a designation acquisition step of acquiring a designation of one of the pieces of encrypted content;
a management source acquisition step of acquiring, from among the pieces of management source information recorded on the content recording medium, a piece of management source information that corresponds to the designated piece of encrypted content;
a key information acquisition step of acquiring, from the management source apparatus shown by the acquired piece of management source information, a piece of key information that shows usage permission for the designated piece of encrypted content;
a decryption step of generating, using a processor, a content key based on the acquired piece of key information, and generating a piece of content by decrypting the designated piece of encrypted content with use of the generated content key; and
a playback step of playing the generated piece of content,
wherein at least one of the pieces of management source information includes a plurality of pieces of candidate information, each piece of candidate information showing a different one of a plurality of candidate apparatuses that are candidates for the management source apparatus pertaining to the piece of encrypted content corresponding to the piece of management source information, and wherein the key information acquisition step includes:
  a candidate information judgment step of judging whether the acquired piece of management source information includes pieces of candidate information;

an acquisition-destination determination step of, when the judgment is affirmative, selecting one of the pieces of candidate information included in the acquired piece of management source information; and a key information acquisition step of, when the judgment is affirmative, acquiring, from the management source apparatus, which is the candidate apparatus shown in the selected piece of candidate information, the piece of key information showing usage permission for the designated piece of encrypted content, and when the judgment is negative, acquiring the piece of key information from the management source apparatus shown by the piece of management source information.

* * * * *